(12) United States Patent
Lwowski et al.

(10) Patent No.: US 11,928,594 B2
(45) Date of Patent: Mar. 12, 2024

(54) SYSTEMS AND METHODS FOR CREATING TRAINING DATA

(71) Applicant: Plus One Robotics, Inc., San Antonio, TX (US)

(72) Inventors: Jonathan Lwowski, San Antonio, TX (US); Abhijit Majumdar, San Antonio, TX (US)

(73) Assignee: Plus One Robotics, Inc.

( * ) Notice: Subject to any disclaimer, the term of this patent is extended or adjusted under 35 U.S.C. 154(b) by 0 days.

(21) Appl. No.: 17/396,941

(22) Filed: Aug. 9, 2021

(65) Prior Publication Data

US 2021/0374472 A1 Dec. 2, 2021

Related U.S. Application Data

(63) Continuation of application No. 17/139,974, filed on Dec. 31, 2020, now Pat. No. 11,087,172.

(60) Provisional application No. 62/955,471, filed on Dec. 31, 2019.

(51) Int. Cl.
| | |
|---|---|
| *G06N 3/08* | (2023.01) |
| *G06F 18/214* | (2023.01) |
| *G06F 18/2413* | (2023.01) |
| *G06N 3/04* | (2023.01) |
| *G06V 10/772* | (2022.01) |
| *G06V 10/774* | (2022.01) |
| *G06V 10/776* | (2022.01) |
| *G06V 20/10* | (2022.01) |

(52) U.S. Cl.
CPC ............. *G06N 3/08* (2013.01); *G06F 18/214* (2023.01); *G06F 18/2413* (2023.01); *G06N 3/04* (2013.01); *G06V 10/772* (2022.01); *G06V 10/774* (2022.01); *G06V 10/776* (2022.01); *G06V 20/10* (2022.01)

(58) Field of Classification Search
CPC .. G06K 9/6256; G06K 9/00664; G06K 9/627; G06N 3/04; G06N 20/00; G06N 3/08; G06V 10/772; G06V 10/774; G06V 10/776; G06V 20/10
See application file for complete search history.

(56) References Cited

U.S. PATENT DOCUMENTS

| | | | |
|---|---|---|---|
| 2018/0250826 A1* | 9/2018 | Jiang | G06V 10/764 |
| 2020/0027002 A1* | 1/2020 | Hickson | G06T 7/50 |
| 2020/0051291 A1* | 2/2020 | Cinnamon | G06T 17/30 |

\* cited by examiner

*Primary Examiner* — Ruiping Li
(74) *Attorney, Agent, or Firm* — Outlier Patent Attorneys, PLLC

(57) ABSTRACT

Training images can be synthesized in order to obtain enough data to train a model (e.g., a neural network) to recognize various classifications of a type of object. Images can be synthesized by blending images of objects labeled using those classifications into selected background images. To improve results, one or more operations are performed to determine whether the synthesized images can still be used as training data, such as by verifying one or more objects of interested represented in those images is not occluded, or at least satisfies a threshold level of acceptance. The training images can be used with real world images to train the model.

20 Claims, 13 Drawing Sheets

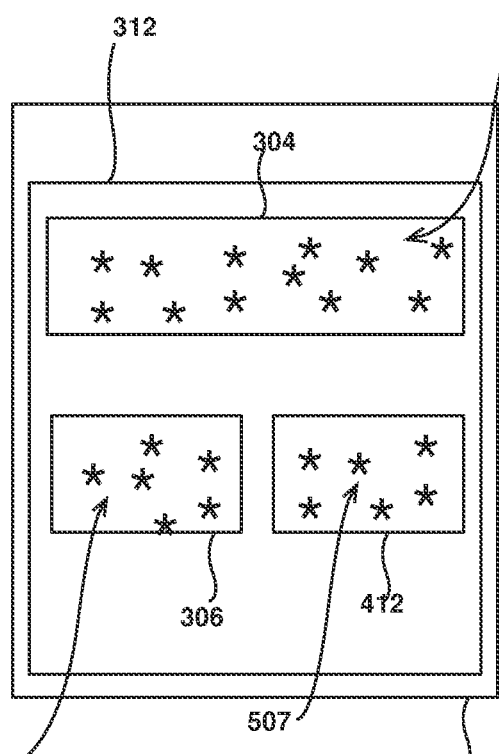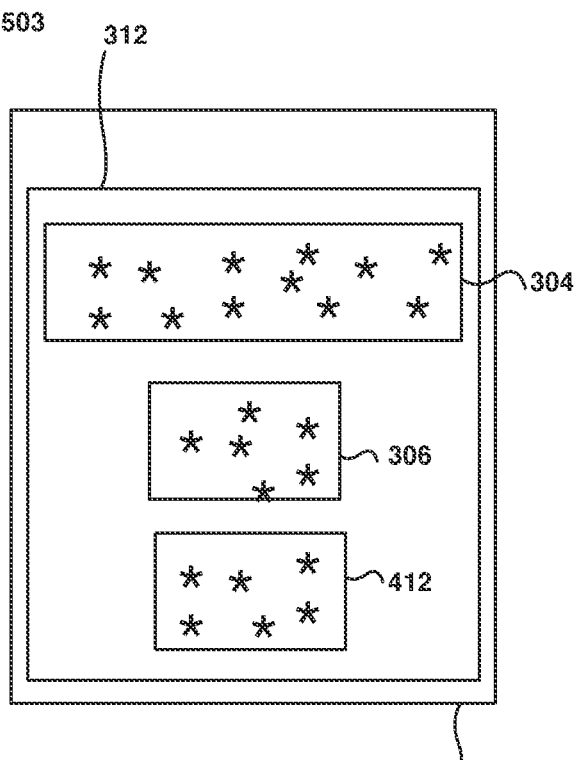
FIG. 5A  FIG. 5B
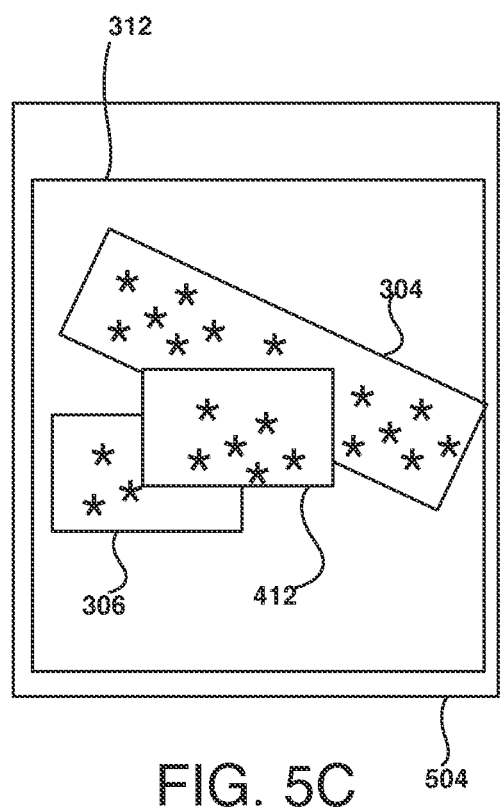
FIG. 5C

SYSTEMS AND METHODS FOR CREATING TRAINING DATA

CROSS-REFERENCE TO RELATED APPLICATIONS

The present application is a Continuation of U.S. patent application Ser. No. 17/139,974, filed Dec. 31, 2020 and claims the benefit of U.S. Provisional Application No. 62/955,471, filed Dec. 31, 2019, the contents of which are incorporated herein by reference in their entirety.

BACKGROUND

Industrial robotic package conveyance systems are beginning to use artificial intelligence ("AI"), and specifically machine learning ("ML"), for classifying and/or detecting packages (and/or package properties) of objects that may pass through the conveyance system. For example, an AI or ML system may be used to identify packages that may be placed on a conveyor belt or a picking tote or container. Once the packages are identified, further processing may be performed to determine if the packages are pickable and/or to identify pick points to enable a robot to pick the packages and place them at a destination in an effort to sort and/or process the packages.

Training these AI and/or ML systems, however, require significant training data. For example, training data identifying a variety of different packages, objects, etc. on a variety of different conveyor belt systems and/or totes, or picking bins may be required to adequately train industrial robotic package conveyance systems. Moreover, an accurate classification of whether the package is pickable and/or an appropriate location for picking the packages may be required to successfully use AI and/or ML systems to pick packages in a high-flow, high-throughput robotic system.

In a situation where there is not sufficient training data, AI and/or ML system may struggle with classifying edge cases, such as when it is difficult to detect an end of a border of a first object and a start of a border of a second object. In many instances, training data for certain problematic situations may occur with little frequency, and therefore, the training dataset may comprise little to no instances of the certain problematic situations. In other instances, it may be overly complex and/or expensive to physically generate training data with appropriate labels. As such, the need to attempt to obtain and classify content for a large variety of classifications, and sub-classifications, can be daunting at best and in many instances can prevent machine learning from being utilized in a way that provides satisfactory results to users.

SUMMARY

Systems and methods in accordance with various embodiments of the present disclosure may overcome one or more of the aforementioned and other deficiencies experienced in conventional approaches to generating data in an industrial robotic package conveyance system. In particular, various embodiments provide for the synthesizing of images useful in training models (e.g., neural networks) or other machine learning-based algorithms to recognize types of objects and the location of those objects within two and three-dimensional data. More specifically, approaches disclosed herein may be implemented in an industrial robotic picking system, wherein, the generated training data may be used to train a robotic classification system to identify pick points for picking one or more objects in a group or pile of objects that may be placed in a bin or other selection area.

Deep learning approaches generally require a significant amount of training data to achieve satisfactory performance. Acquiring good quality training data using conventional approaches is very expensive and time-consuming. In order to obtain the amount of data needed for accurate training, approaches in accordance with various embodiments can synthesize training images by generating composite or synthesized image data that is pre-labelled for training and/or classification purposes. The composite image data generated by extracting background image information (representing an environment such as a bin) and applying labelled foreground image information (representing, for example, an object such as a package, an envelope etc.) Additional layers of data (including, for example, 3D point cloud data) for other objects, boxes, envelopes, etc. may be added to the composite image data. The composite image data (now comprising additional layers of data) may be analyzed to determine if the labeled foreground data is still "pickable." If so, the composite image data may be labelled "pickable" and may be used as training data to train a model. If the labelled foreground data is no longer "pickable" because of occlusion by objects represented in other layers, then the composite image data may be labelled "unpickable." The data labelled "unpickable" may also be used as training data to train the model. A set of such images can be generated such that between the real-world images and the synthesized images there are a sufficient number of images to train the model for each relevant classification.

Advantageously, the amount of data required to train a machine learning and/or AI classifier is greatly reduced. Moreover, the present invention reduces time and costs associated with generating training data when compared to traditional data capture and label approaches. Various other functions and advantages are described and suggested below as may be provided in accordance with the various embodiments.

More specifically, the present invention is a computing system, a non-transitory computer readable storage medium storing instructions (that, when executed by at least one processor of a computing system, causes the computing system), and/or a computer implemented method for: generating training data in an automated robotic package conveyance system, wherein the generated training data may be used to identify packages and/or package properties in a robotic conveyance system to: determine a set of classifications corresponding to a type of object; obtain a set of catalog images including representations of objects having labels corresponding to the set of classifications; obtain foreground imaging data including representations of objects having labels corresponding to the set of classifications and being in real-world environments; obtain background imaging data including representations of at least some of the real-world environments; identify portions of the foreground imaging data including the representations of the objects; identify portions of the background imaging data including representations of the real-world environments; blend the portions of the foreground imaging data and the portions of the background imaging data to generate a set of composite training images; analyze the set of composite training images to determine a subset of composite training images, individual representations of the objects in the subset of composite training images satisfying acceptance criteria; and provide the subset of composite training images and the set of catalog images for use in training a model for the type of object.

Moreover, the computing system, a non-transitory computer readable storage medium storing instructions (that, when executed by at least one processor of a computing system, causes the computing system), and/or a computer implemented method enable the system to use the subset of composite training images and the set of catalog images to train the model for the type of object and/or receive a query image including a specific representation of the type of object; and/or process the query image using the model to determine a corresponding classification for the specific representation; and/or provide information corresponding to the determined classification in response to the query image; and/or select a background layer corresponding to a subregion of a background image associated with the background imaging data; and/or insert a selected object portion as a top layer over the selected background layer; and/or use a blending technique on the top layer and the background layer to generate one of the composite training images; and/or determine an object placement region of the background imaging data; and/or place the portions of the foreground imaging data into the background imaging data using at least one of a location or a scale based at least on the object placement region; and/or obtain selection information of an object represented in a composite image of the set of composite training images, the selection information corresponding to one of a set of pick points associated with the object or a pickable area of the object; and/or determine that the selection information satisfies the acceptance criteria; and/or add the composite image to the subset of composite images; and/or obtain additional imaging data that includes a representation of a new object having a label corresponding to a type of classification; and/or add the representation of the new object to one of the composite training images of the subset of composite training images; and/or obtain selection information for the new object; and/or determine whether the selection information satisfies the acceptance criteria; and/or apply a classification to the new object. In one embodiment, the type of object may be a box, a bag, or an envelope.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

FIGS. 3A, 3B, 3C, and 3D illustrate an example approach to determining foreground and background imaging data in accordance with various embodiments.

Figure 4A:
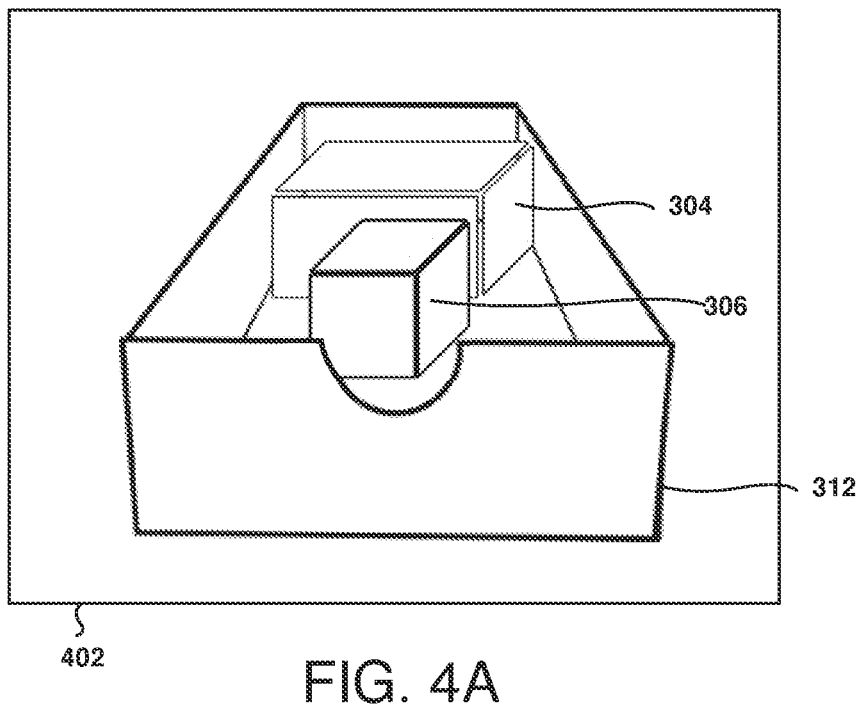
Figure 4B:
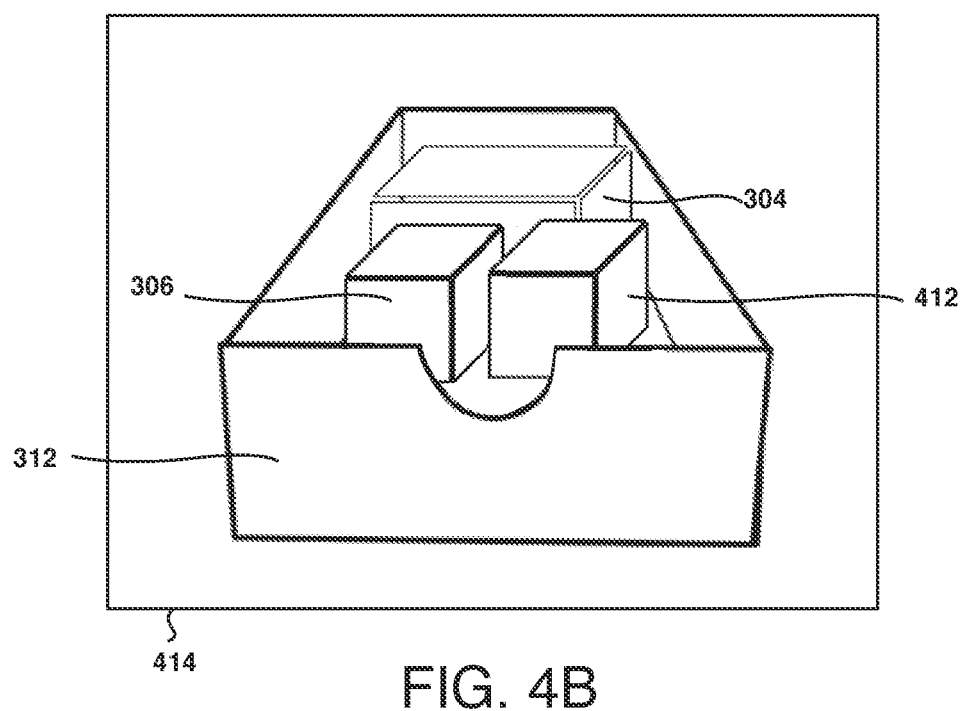

FIGS. 4A and 4B illustrate an example approach to synthesizing training images that can be utilized in accordance with various embodiments.

FIGS. 5A, 5B, and 5C illustrate an example approach to labeling synthesized images that can be utilized in accordance with various embodiments.

Figure 6:
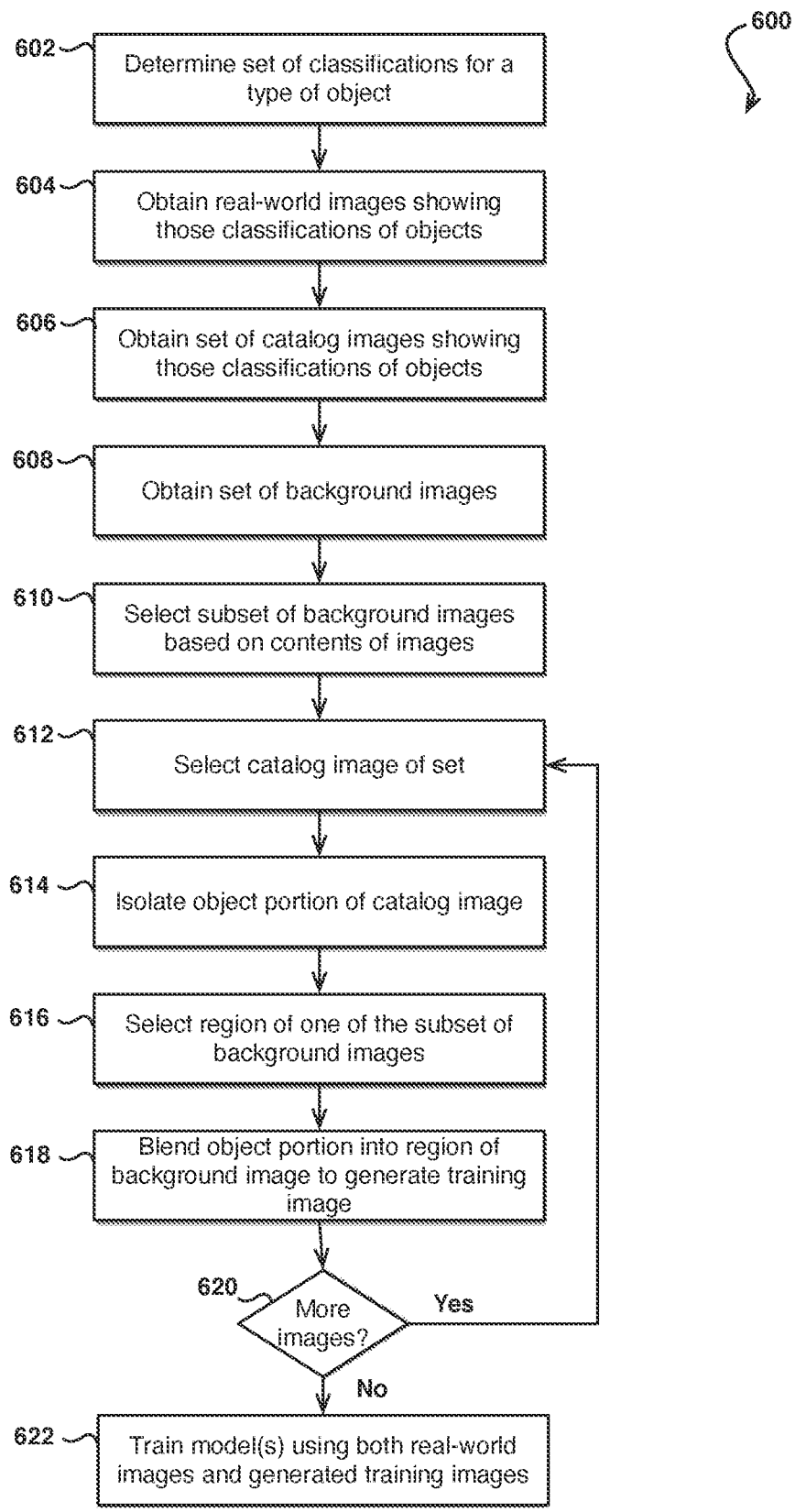

FIG. 6 illustrates an example process for obtaining images for training a model that can be utilized in accordance with various embodiments.

Figure 7:
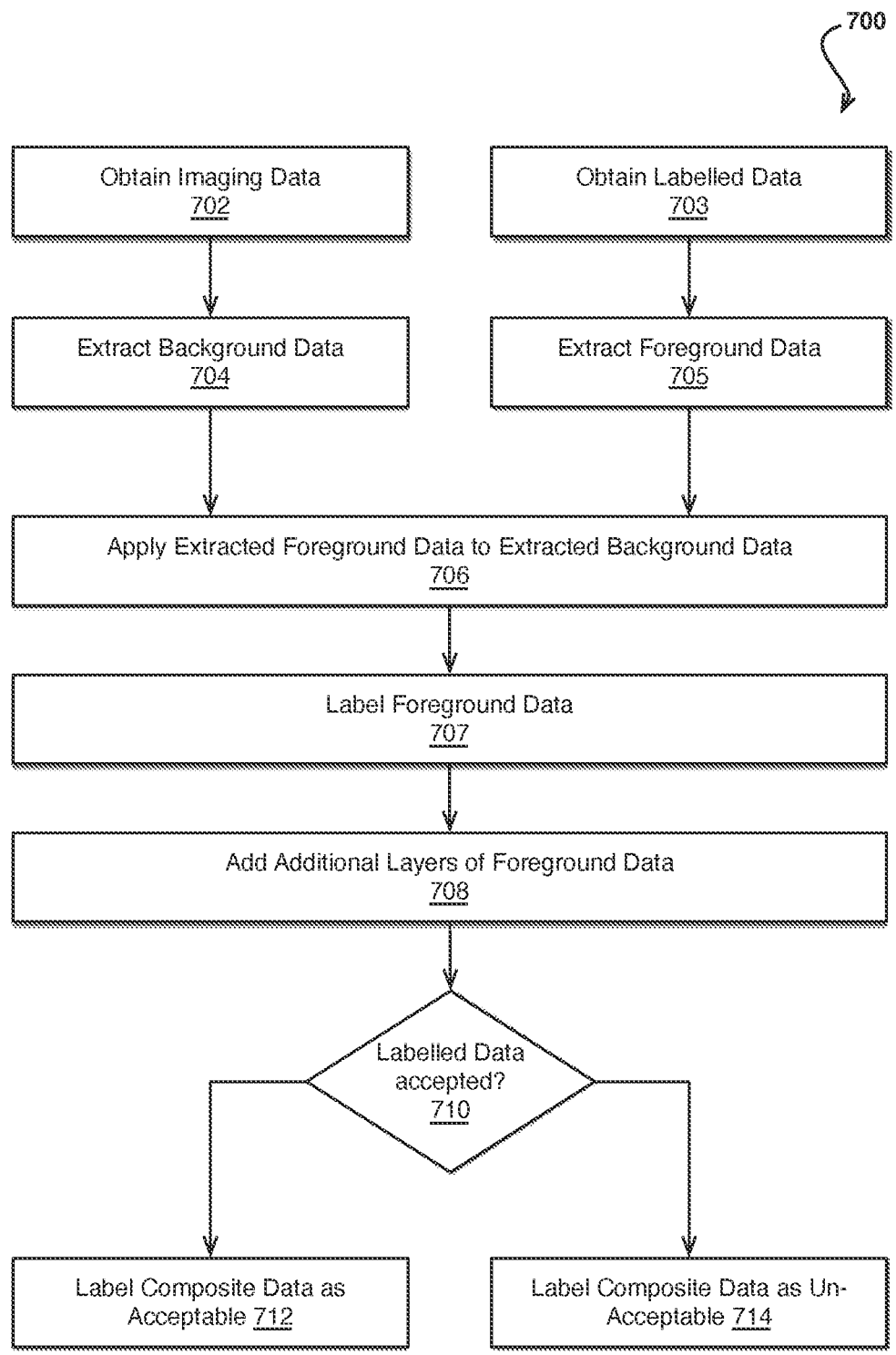

FIG. 7 illustrates an example process for generating training data that can be utilized in accordance with an alternate embodiment.

Figure 8:
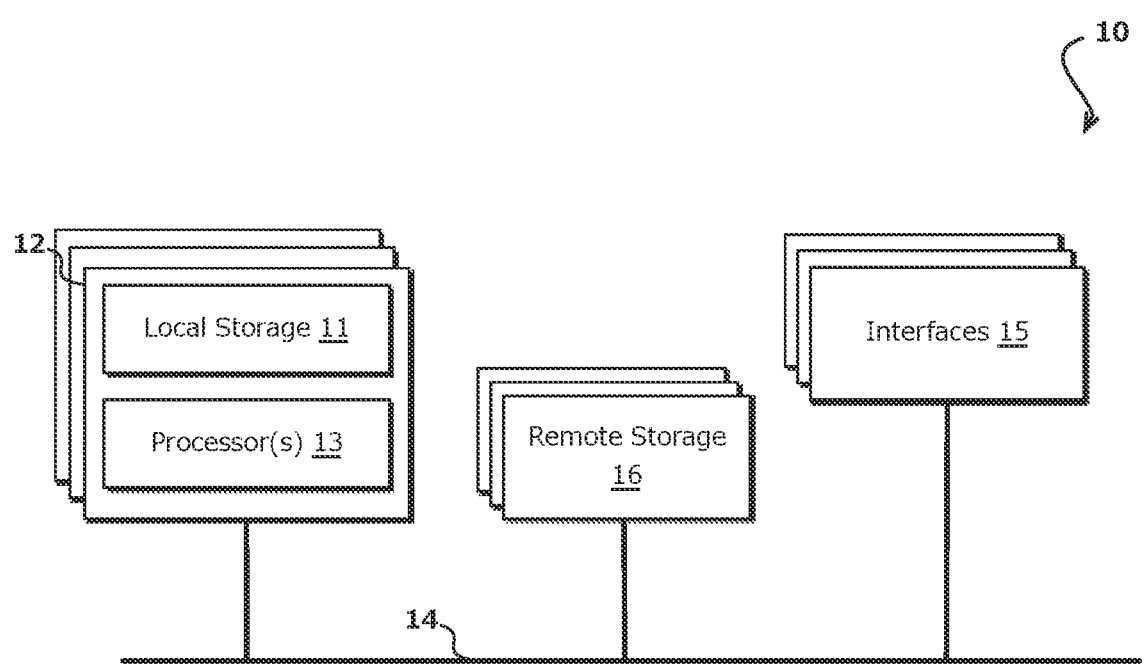

FIG. 8 illustrates an exemplary computing device that can be used in accordance with various embodiments.

Figure 9:
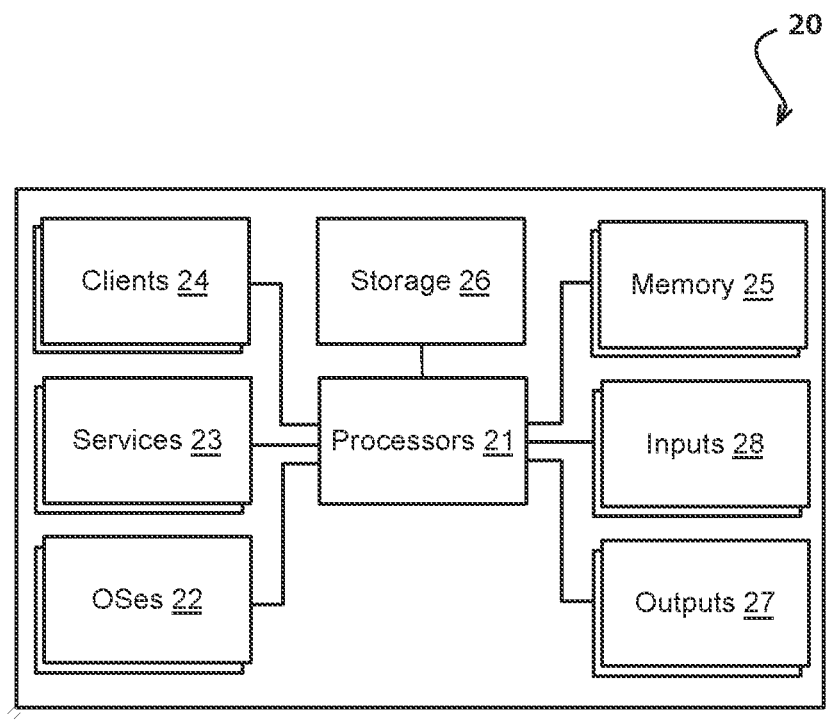

FIG. 9 illustrates an exemplary standalone computing system that can be used in accordance with various embodiments.

Figure 10:
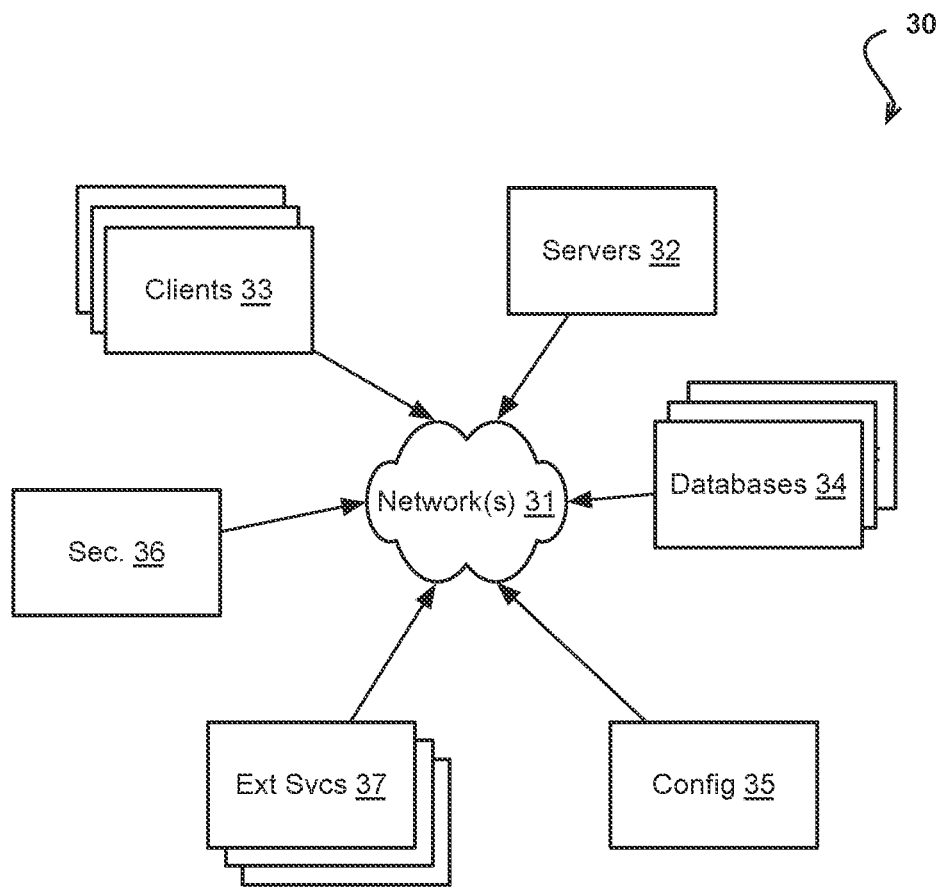

FIG. 10 illustrates an embodiment of the computing architecture that can be used in accordance with various embodiments.

Figure 11:
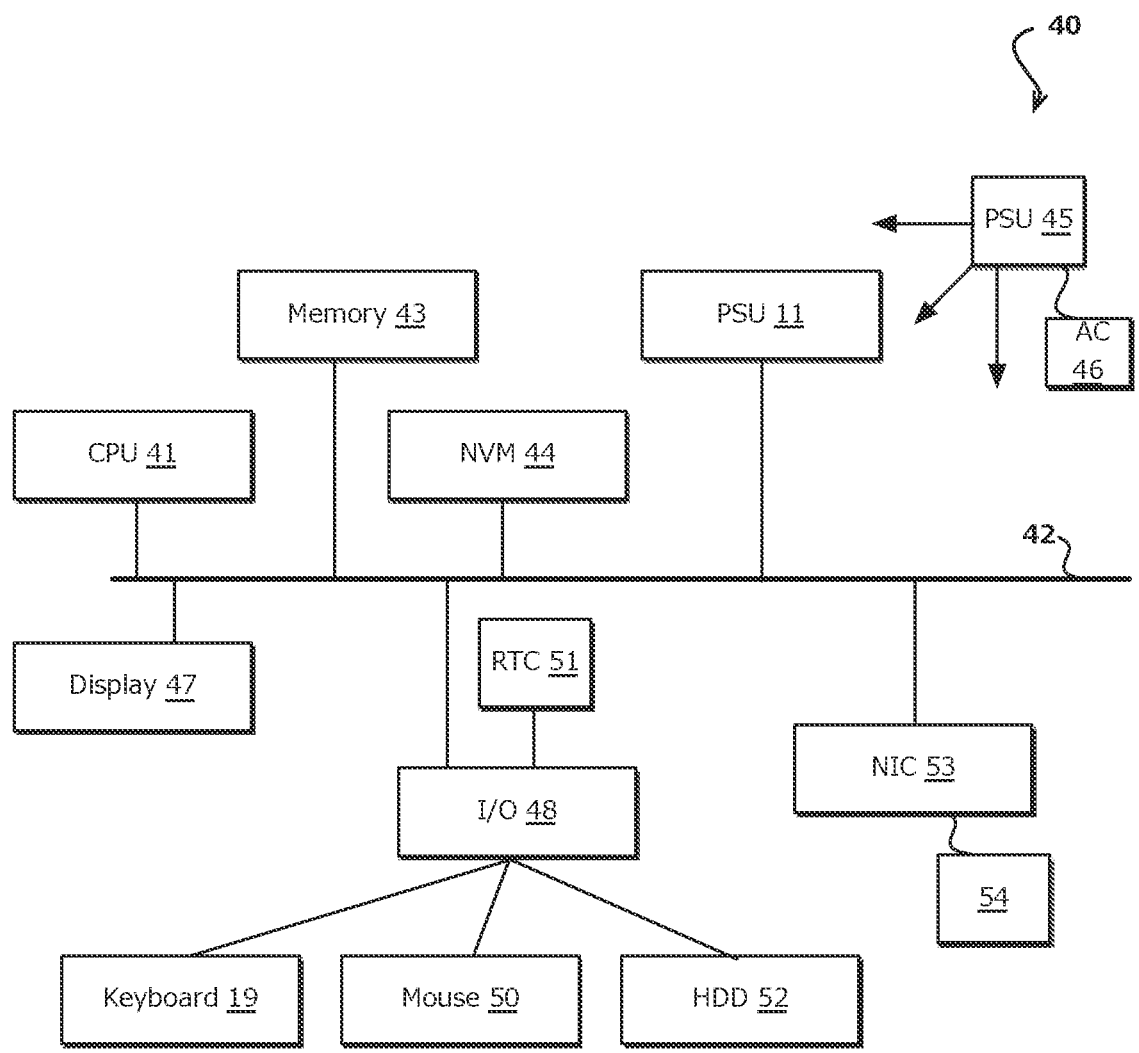

FIG. 11 illustrates an exemplary overview of a computer system that can be used in accordance with various embodiments.

DETAILED DESCRIPTION

The inventive systems and methods (hereinafter sometimes referred to more simply as "system" or "method") described herein significantly reduce the time and cost it takes to train an artificial intelligence ("AI"), and specifically, a machine learning ("ML") application. They also increase the accuracy of the application. Specifically, the system extracts a particular object from imaging data of a monitored area (background data) and an object labelled as pickable from labelled data (foreground data of interest). The system creates composite data also referred to as synthesized data with the background data and the foreground data of interest. The system extracts more objects from the labelled data (other foreground data) and adds the other foreground data to the composite data. The system determines if the foreground data of interest is occluded by the other foreground data in the composite data and gives the foreground data of interest an appropriate label (e.g., pickable, un-pickable, etc.) The composite data is added to a training data set.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step).

Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Figure 1A:
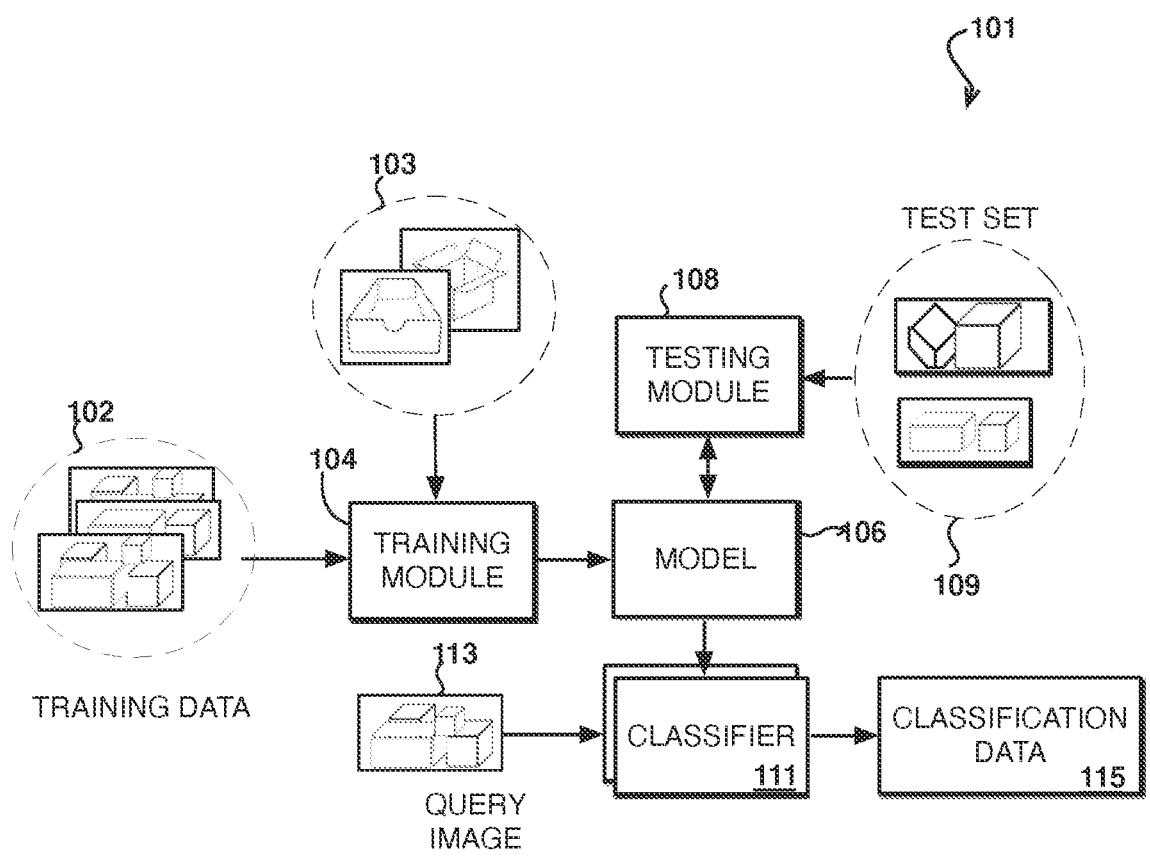
FIG. 1A illustrates an example approach to training and utilizing a model to classify content that can be utilized in accordance with various embodiments

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art. The present invention may be applied to classification and/or detection techniques, wherein an entire image and/or a portion of an image (i.e. points of interest within the image as well as position and/or location information associated with the points of interest) may be processed according to the processes and computation methodologies disclosed herein FIG. 1A illustrates an example classification pipeline 101 that can be utilized in accordance with various embodiments. In this example, imaging data including a set of images 102 and 103 are obtained that can be used to train one or more models (e.g., neural networks) 106 or other machine learning-based algorithms to recognize various types of objects represented in those images. Imaging data can include, for example, two-dimensional image data, three-dimensional image data, video data, lidar data, magnetic resonance imaging (MRI) data, infrared (IR) data, etc. The imaging data can come from one or more sources, such as from a content provider, the Internet, users, or an electronic catalog, and can include representations of various different types of objects. For example, as will be described further in FIG. 1B, set of images 102 can be obtained from background imaging system 110 and set of images 102 can be obtained from foreground imaging system 120. In order to function as training data for the models, at least some of the images will include (or be associated with) data that indicates a type or classification of objects represented in each image. For example, set of images 103 may comprise labelled imaging data. Labelled imaging data can include imaging data associated with metadata or other data that specifies whether an object represented in the imaging data is capable of being picked up, "pickable," or otherwise correctly handled by a robotics system. As used herein, an object may be labelled as "pickable" when a determination, based on the various label and label-type data for that object, or other processing, is made that a robotics component may pick up the particular object. Set of images 103 might include metadata such as "un-occluded," "occluded," "un-pickable," "pickable," or a combination thereof. The classifications in at least some embodiments will be selected from a set of classifications, or sub-classifications, used to identify various types of objects.

In some embodiments the set of images will be analyzed to determine which images include data sufficient to identify a type of object represented in each of those images, and those images can be considered a training set to be used to train a model. In at least some embodiments there is one model trained for each type of object, with multiple types of classifications of that type of object being possible outcomes from the network. In some embodiments, a portion of the training set will be retained as a testing set 109 to use to test the accuracy of the trained model. In this example, the training images are accessible to a training module 104 which can feed the images to model 106 in order to train the model. As mentioned, the image and classification data will be fed to the model so the model can learn features of objects associated with different classifications of objects. The network can then learn various combinations or relations of features for different classifications, such that when a query image is processed with the trained model the model can recognize the features and output the appropriate classification, although various other approaches can be utilized as well within the scope of the various embodiments.

In some embodiments the training images (102, 103) are to be used as training data for a convolutional neural network or other deep neural network. As mentioned, the images can be classified, either when provided or through a classification analysis, to determine a primary classification, such as "un-occluded" or "pickable." Various other images provided by third party sources can be used for training as well as discussed and suggested elsewhere herein. The neural network can be trained using some or all of the designated training data. Once at least the initial training has completed, a testing module 108 can utilize the testing images 109 to test the trained neural network. Since the testing images already include classification data, the classifications generated by the neural network can be compared against that data to determine the accuracy of the neural network, both overall and for different categories of objects. The testing images can also be used to further train the neural network. The results can be analyzed and if the results are acceptable, such as where the accuracy at least meets a minimum accuracy threshold for some or all of the classifications, the neural network can be provided to a classifier 111 that is able to accept query images 113 from various sources, such as end users, and generate classification data including classifications 115 for objects represented in those images. The query images might also come from the provider itself, for use in an electronic catalog or otherwise. As mentioned later herein, such an approach can be used for a number of different purposes, such as to classify objects for a picking system, such as picking system 140 in FIG. 1B, where the object represented might not be classified, might have improper classification, or might provide classification per a different scheme, etc.

It should be noted that although neural networks are used as an example machine learning-based model, various other networks or trained models can be used as well within the scope of the various embodiments.

In order for the neural network to provide sufficient accuracy, the neural network will in many cases need to process enough images of each type or classification of object to be able to accurately recognize those types of objects. For objects in an industrial robotic picking system such as a mailroom, shipping facility, etc., these objects can have many different sub-categories or sub-classifications, which may require a very large set of training images. As the number of categories increases, or the number of sub-category divisions increases, the total number of images needed to train the neural network will in most cases increase as well, and the available resources to obtain the training images decreases. In order to ensure accuracy, the training images will need to include an appropriate classification for the object(s) represented. This can be quite burdensome and expensive, as it can be difficult to generate or obtain a sufficient number of classified images of each classification of object. In many cases the classification will involve at least one human examining each image. The problem is exacerbated by the fact that as the classifications become more granular it will be increasingly difficult for the person to be able to determine the appropriate classification. Further, for mailroom applications such as a room configured to manage mail, packages, etc. the problem becomes further complicated because objects shipped come in different shapes and sizes. In addition to obtaining sufficient training data, it is necessary in at least some embodiments to obtain training images with a variety of background such that the network can recognize the object represented independent of the other information contained in the image or represented in the environment.

Accordingly, approaches in accordance with various embodiments can attempt to generate or "synthesize" training images for use in training one or more models (e.g., neural networks) or other machine learning-based algorithms. Such approaches can take representations of classified objects, such as objects to be picked up, or otherwise moved or transported, and environments, such as a bin, and generate a composite or synthesized image that is pre-labelled for training and/or classification purposes. The composite image may be generated by extracting background information (representing an environment such as a bin) and applying labelled foreground information (representing, for example, an object such as a package, an envelope etc.) to generate additional training images of varying complexity and composition. Additional layers of data (including, for example, 3D point cloud data) for other objects, boxes, bags, envelopes, etc. may be added to the composite image (e.g., 3D point cloud data). The composite image (e.g., 3D point cloud data), now comprising additional layers of data, may be analyzed to determine if the labeled foreground data is still "pickable." If so, the composite may be labelled "pickable" and may be used as training data to train a model. If the labelled foreground data is no longer "pickable" because of occlusion by other layers, or fails to satisfy other acceptance criteria, then the composite image may be labelled "unpickable." The data labelled "unpickable" may also be used as training data to train a model. Such an approach can help to not only provide more training data, but also to provide more variety in background combinations and the like.

While three-dimensional models and other approaches can be utilized as discussed herein, using two-dimensional techniques in many instances is sufficient to train a model (e.g., neural network) for various classifications of objects as may be represented in a variety of different situations. In some embodiments, the synthesized images are used to train deep learned industrial robotic picking system-type classifiers that can be used for a variety of different purposes. In at least some embodiments, the synthesized images can be used alongside real world images in order to obtain even more accurate classification results.

Figure 1B:
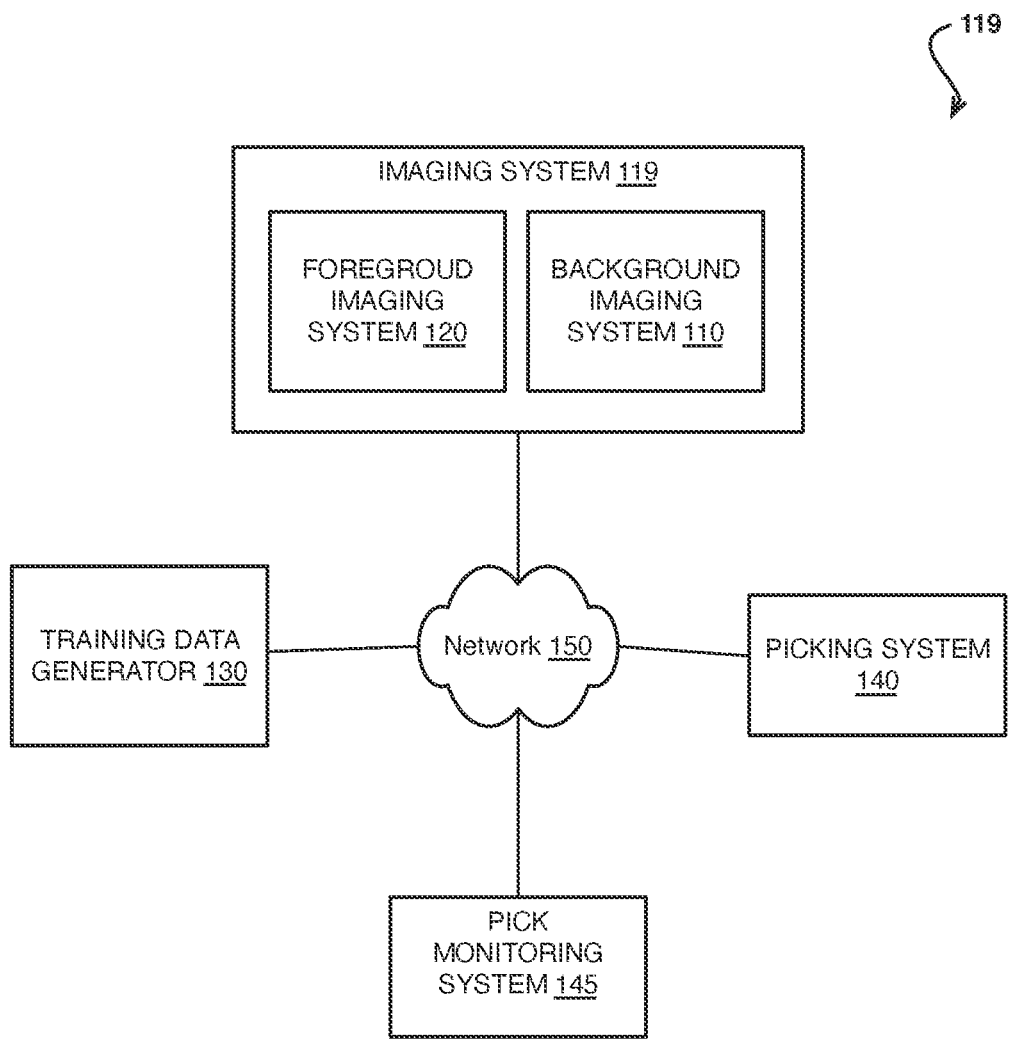
FIG. 1B illustrates an example system for generating training data that can be utilized in accordance with various embodiments.

FIG. 1B illustrates an example system 119 for generating training data that can be utilized in accordance with various embodiments. The system may comprise imaging system 119 that includes background imaging system 110 and foreground imaging system 120; training data generator 130, picking system 140, pick monitoring system 145, and network 150 over which various systems communicate and interact. Training data generator 130 will be described in greater detail in FIG. 2A below; however, generally, training data generator 130 generates data to train a model. The various computing devices described herein are exemplary and for illustration purposes only. The system may be reorganized or consolidated, as understood by a person of ordinary skill in the art, to perform the same tasks on one or more other servers or computing devices without departing from the scope of the invention.

Background imaging system 110 may comprise at least one image capture element, such as a camera or camera sensor, operable to perform functions such as image and/or video capture. Each image capture element may be, for example, a charge-coupled device (CCD), a motion detection sensor, or an infrared sensor, or can utilize another appropriate image capturing technology. Background imaging system 110 may generate a three-dimensional (3D) image and/or video using capture image date (e.g., still images and/or video). The 3D image and/or video may comprise one or more 3D point clouds. A point cloud can include a set of data points in space. The points represent a 3D shape or object. Each point has its set of X, Y and Z coordinates.

Background imaging system 110 may produce a two-dimensional (2D) image and/or video. The 2D image and/or video may comprise one or more 2D objects. Background imaging system 110 may monitor an area of interest, such as a mailroom, conveyor system, and sortation facility, and/or an area within a camera or an image acquisition system's field of view. The one or more 3D point clouds and/or the one or more 2D objects may represent an object present in the monitored area, such as a tray, a bin, etc. Background imaging system 110 may create and/or reproduce real-time and/or near real-time imaging data of a monitored area of interest.

Foreground imaging system 120 may comprise labelled imaging data. Labelled imaging data can include imaging data associated with metadata or other data that specifies whether an object represented in the imaging data is capable of being picked up or otherwise correctly handled by a robotics system in accordance with embodiments described herein. Foreground imaging system 120 may produce three-dimensional (3D) image and/or video data. The 3D image and/or video data may comprise one or more 3D point clouds. The foreground imaging system 120 may produce two-dimensional (2D) image and/or video data. The 2D image and/or video may comprise one or more 2D objects.

The foreground imaging system 120 may comprise imaging data labelled manually or by a trained model. Labels may be associated with particular 3D point clouds and/or 2D objects. A particular 3D point cloud and/or 2D object may be labeled as, for example, "un-occluded" and/or "pickable," etc. if the trained model is used to determine that an associated robotics device may pick up an object represented by the particular 3D point cloud and/or 2D object, such as a package that is unobstructed by other packages. A particular 3D point cloud and/or 2D object may be labeled as, for example, "occluded" and/or "un-pickable," etc. if the trained model is used to determine that an associated robotics device may not pick up an object represented by the particular 3D point cloud and/or 2D object, such as a package that is obstructed by other packages and cannot be picked up without risking harming the other, obstructing packages. A variety of other labels and/or label types, which may assist a classification and detection system, may be provided and used without departing from the scope of the invention, including, for example, an object type label (e.g., box, envelope, etc.), occluded and/or pickable/un-pickable labels, as described herein, etc.

As will be described in more detail in reference to FIG. 2A, training data generator 130 may use data extracted from background imaging system 110 and foreground imaging system 120 to create training data for picking system 140. In an embodiment, the training data generator 130 may be used to create training data with corner cases that picking system 140 struggles with but rarely encounters. A corner case involves, for example, a problem or situation that occurs only outside of normal operating parameters—specifically one that manifests itself when multiple environmental variables or conditions are simultaneously at extreme levels, even though each parameter is within the specified range for that parameter.

Picking system 140 may comprise a computer vision system to detect objects within an environment, such as detecting envelopes, packages, containers, etc. Picking system 140 may comprise robotics for picking up (e.g., sorting, etc.) a detected object. Picking system 140 may utilize a trained model to determine if a detected object should be picked up or not.

Pick monitoring system 145 may comprise a display and/or audio to present information associated with picking system 140 to one or more users. Pick monitoring system 145 may comprise input to allow the one or more users to provide feedback to picking system 140. Pick monitoring system 145 may be used to correct errant behavior of the picking system 140 and/or reinforce desired behavior of picking system 140.

One or more of background imaging system 110, foreground imaging system 120, training data generator 130, picking system 140, and/or pick monitoring system 145 may partially and/or fully be implemented on one or more computing device(s). Further, the various systems may be hosted on multiple server computers and/or distributed across multiple systems. Additionally, the systems may be performed by any number of different computers and/or systems. Thus, the systems may be separated into multiple services and/or over multiple disparate systems to perform the functionality described herein.

A computing device may include, generally, a computer or computing device including functionality for communicating (e.g., remotely) over a network 150. Data may be collected from computing devices, and data requests may be initiated from each computing device. Computing device(s) may be a server, a desktop computer, a laptop computer, personal digital assistant (PDA), an in- or out-of-car navigation system, a smart phone or other cellular or mobile phone, or mobile gaming device, among other suitable computing devices. Computing devices may execute one or more client applications, such as a web browser (e.g., Microsoft Windows Internet Explorer, Mozilla Firefox, Apple Safari, Google Chrome, and Opera, etc.), or a dedicated application to submit user data, or to make prediction queries over a network 150.

In particular embodiments, each computing device may be an electronic device including hardware, software, or embedded logic components or a combination of two or more such components and capable of carrying out the appropriate functions implemented or supported by the computing device. For example and without limitation, a computing device may be a desktop computer system, a notebook computer system, a netbook computer system, a handheld electronic device, or a mobile telephone. The present disclosure contemplates any computing device. A computing device may enable a network user at the computing device to access network 150. A computing device may enable its user to communicate with other users at other computing devices.

A computing device may have a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A computing device may enable a user to enter a Uniform Resource Locator (URL) or other address directing the web browser to a server, and the web browser may generate a Hyper Text Transfer Protocol (HTTP) request and communicate the HTTP request to server. The server may accept the HTTP request and communicate to the computing device one or more Hyper Text Markup Language (HTML) files responsive to the HTTP request. The computing device may render a web page based on the HTML files from server for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

The computing device may also include an application that is loaded onto the computing device. The application obtains data from the network 150 and displays it to the user within the application interface.

Exemplary computing devices are illustrated in some of the subsequent figures provided herein. This disclosure contemplates any suitable number of computing devices, including computing systems taking any suitable physical form. As example and not by way of limitation, computing systems may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computing system may include one or more computer systems; be unitary or distributed; span multiple locations; span multiple machines; or reside in a cloud, which may include one or more cloud components in one or more networks. Where appropriate, one or more computing systems may perform without substantial spatial or temporal limitation one or more steps of one or more methods described or illustrated herein. As an example, and not by way of limitation, one or more computing systems may perform in real time or in batch mode one or more steps of one or more methods described or illustrated herein. One or more computing system may perform at different times or at different locations one or more steps of one or more methods described or illustrated herein, where appropriate.

The network 150 generally represents a network or collection of networks (such as the Internet or a corporate intranet, or a combination of both) over which the various components illustrated in FIG. 1B (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to computing devices or other devices in response to HTTP or other requests from computing devices or other devices. A mail server is generally capable of providing electronic mail services to various computing devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1B, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2A:
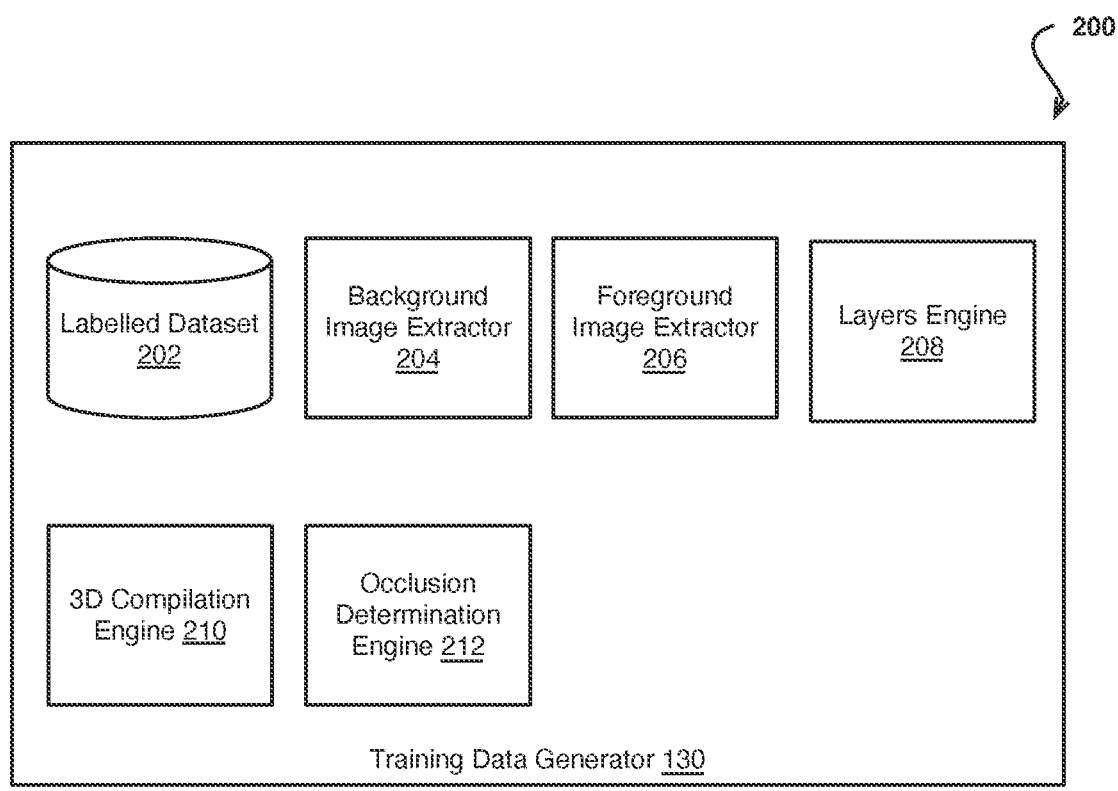
FIG. 2A illustrates an example system that can be utilized in accordance with various embodiments.

FIG. 2A illustrates an example system 200 that can be utilized in accordance with various embodiments. Training data generator 130 creates training data to be used to train a model such as a neural network. Training data generator 130 may comprise labelled dataset 202, background image extractor 204, foreground image extractor 206, layers engine 208, 3D compilation engine 210, and occlusion determination engine 212. Other systems and databases may be used, as would be readily understood by a person of ordinary skill in the art, without departing from the scope of the invention.

Labelled dataset 202 may comprise a database with imaging data, wherein particular objects are labelled. Labelled dataset 202 may be comprised of a variety of labels and/or label types, which may assist a classification and detection system. In one embodiment, the labels may be provided by foreground imaging system 120 without departing from the scope of the invention, including, for example, an object type label (i.e. box, envelope, etc.), occluded and/or not-occluded labels, as described herein, etc. In an example, the labels may be manually provided. In another example, picking system 140 in FIG. 1B can attempt to pick up an object and the result can be used to label object representations as pickable or un-pickable. For example, a bin with objects can be evaluated by picking system 140. In an example, this can include picking system 140 analyzing imaging data of objects and attempting to pick up objects based on the analysis. In the situation picking system 140 is able to pick up an object, imaging data including a representation of the object can be labelled pickable. In the situation picking 140 fails to pick up an object, imaging data including a representation of the object that was not picked up can be labelled un-pickable.

Training data generator 130 may enter the various received label and label-type data into the labelled dataset 202. A particular object may be labelled as "pickable" when a determination, based on the various label and label-type data for that object, or other processing, is made that a robotics component may pick up the particular object. A particular object may be labelled as "un-pickable" when a determination is made, based on various label and label-type data, that a robotics component may not pick up the particular object. Labelled dataset 202 may comprise 3D imaging data and a particular object may be represented by a 3D point cloud. Labelled dataset 202 may comprise 2D imaging data and a particular object may be represented by a 2D object. The labelled dataset 202 may comprise video. Labelled dataset 202 may comprise a 3D image. Labelled dataset 202 may comprise a 2D image. Labelled dataset 202 may comprise a block chain accessible by the training data generator 130.

Background image extractor 204 may extract data representing an object from imaging data. For example, the background image extractor 204 may extract data representing an object from imaging data received from the background imaging system 110 in FIG. 1B. Specifically, background image extractor 204 may extract a 3D point cloud representing an object from 3D imaging data. In another example, background image extractor 204 may extract a 2D object representing an object from 2D imaging data.

In various embodiments, background image extractor selects background images from a set of possible background images based on one or more criteria. These criteria can include, for example, that the image includes an indoor or outdoor scene, and not a representation of another object, as that may create confusion as to which item(s) or object(s) in the image correspond to the object for training. There may be other criteria as well, such as minimum or maximum size or resolution, brightness, contrast, and the like. For images with annotations or metadata indicating what is represented, this data can be used to select and/or exclude background images for consideration. In some embodiments, the images can also be processed using object recognition algorithms, or other such approaches to attempt to determine background images that include representations of objects that should cause those images to be excluded from consideration. In some embodiments the selection can be further based on the ability to locate an object placement region in the image. An object placement region as utilized herein refers to a location where an object might typically be represented in an image, such as in the middle of a bin among other such options. Further, aspects such as scale and location can be used in some embodiments such that object images including an entire bin, storage area, or selection area might be selected for backgrounds. In some embodiments images can be analyzed to attempt to remove substantially redundant images, to avoid training on features of that type of background. Similarly, sub-regions of the various background images may be selected in at least some embodiments to further differentiate the backgrounds in the various synthesized images, such as where a single background might be used for ten different object images, but different regions of that background selected for each synthesized image. The selection can be performed randomly in some embodiments, or according to a selection algorithm in others.

Foreground image extractor 206 may extract data representing an object from an entry in the labelled dataset 202. For example, the foreground image extractor 206 may extract data representing an object from imaging data received from the foreground imaging system 120 in FIG. 1B. The foreground image extractor 206 may extract a 3D point cloud representing an object from 3D imaging data. The foreground image extractor 206 may extract a 2D object representing an object from 2D imaging data. In an aspect, the foreground image extractor 206 may seek out an object labelled as "pickable" for extraction.

Layers engine 208 may extract and/or cause extraction of data representing an object from an entry in the labelled dataset 202. For example, layers engine 208 may extract and/or cause extraction of data representing an object from imaging data received from the foreground imaging system 120 in FIG. 1B. Layers engine 208 may extract and/or cause extraction of a 3D point cloud representing an object from 3D imaging data. Layers engine 208 may extract and/or cause extraction of a 2D object representing an object from 2D imaging data. Layers engine 208 may extract and/or cause extraction of the representations of a predefined number of objects. Layers engine 208 may cause foreground image extractor 206 to extract data representing an object. In an aspect, the layers engine 208 may extract and/or cause extraction of an object without regard to how the object is labelled. Layers engine 208 may apply a label to the data initially extracted by the foreground image extractor 206. The label may indicate "pickable".

The 3D compilation engine 210 may combine the data extracted and/or caused to be extracted by the background image extractor 204, the foreground image extractor 206, and the layers engine 208 into composite data. The 3D compilation engine 210 may apply a label to the data initially extracted by the foreground image extractor 206. The label may indicate "pickable," or another appropriate label that indicates the object is capable of correctly being handled by a robotics system.

The occlusion determination engine 212 or other appropriate engine or component may determine if the object represented by the data initially extracted by the foreground image extractor 206 is occluded by any of the objects represented by data added by the layers engine 208 in the composite data, or otherwise fails to satisfy other acceptance criteria. In an embodiment, acceptance criteria can include, for example, one or more thresholds such as a threshold number of detected (e.g., visible) corners of an object, a threshold available surface area of an object, etc. In certain embodiments, the acceptance criteria can include a threshold distance between objects. In an embodiment, acceptance criteria can include whether and by how much objects are allowed to overlap, whether objects can be differentiated by a robot vision system, whether objects can be singulated by available singulation systems, etc. In an embodiment, the acceptance criteria may include satisfying two or more criteria. It should be noted that while embodiments described herein including determining whether an object represented in imaging data is occluded, other features may be determined and used to determine an appropriate label for use in labeling training data. For example, occlusion determination engine 212 may determine features including accessibility to an object, fragility of an object, color of an object, orientation of an object, dimensions of an object, etc.

If a determination is made that the object represented by the data initially extracted by the foreground image extractor 206 is not occluded by any of the objects represented by data added by the layers engine 208, or otherwise satisfies other acceptance criteria, then the object represented by the data initially extracted by the foreground image extractor 206 may be labelled as "pickable" in the composite data and the composite data may be included in a training data set. In an example, a number of corners for an object can be determined. The number of corners can be compared to a corner threshold. In the situation it is determined that the number of determined corners satisfies the corner threshold, the object can be labelled as pickable.

If a determination is made that the object represented by the data initially extracted by the foreground image extractor 206 is occluded by any of the objects represented by data added by the layers engine 208, or otherwise fails to satisfy other acceptance criteria, then the object represented by the data initially extracted by the foreground image extractor 206 may be labelled as "un-pickable," or some other comparable label indicating the object at that time is not capable of correctly being handled by the robotics picking system, in the composite data and the composite data may be included in a training data set. For example, a first acceptance criteria may include detecting a threshold number of corners. A second acceptance criteria may include a distance threshold. In this example, it is determined that the first object satisfies the number of corners threshold. It is determined that the first object is within the second object. In this situation, it is determined that the first object fails to satisfy the distance threshold and the first object is labelled un-pickable.

Figure 2B:
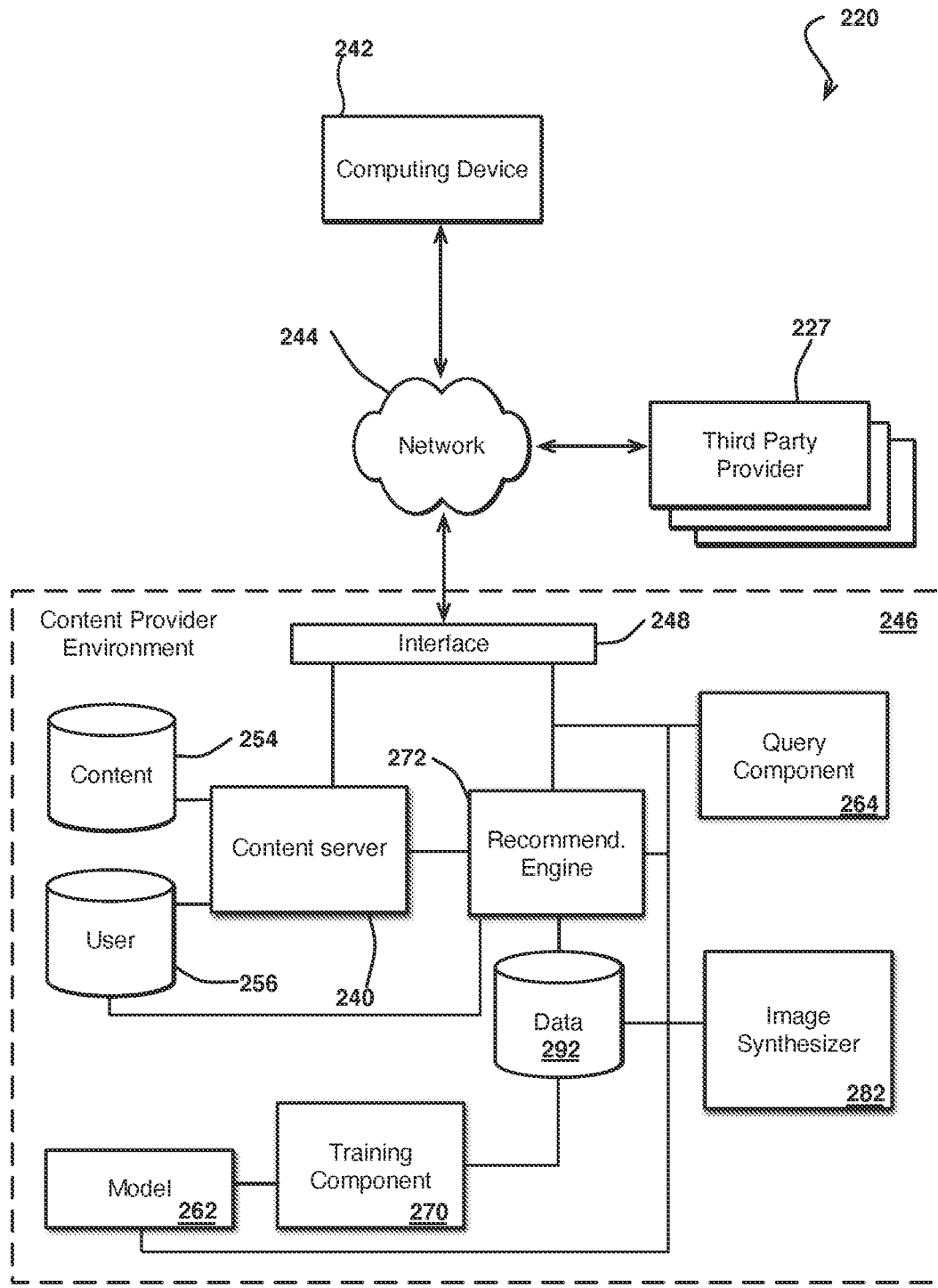
FIG. 2B illustrates an example environment in which aspects of the various embodiments can be implemented.

FIG. 2B illustrates an example environment 220 in which aspects of the various embodiments can be implemented, such as the system described in FIG. 2A. In this example, a computing device 242 is able to make a call or request across one or more networks 244 to a content provider environment 246. In certain embodiments, a request can be received from a third party 227, such as a customer or other user of the system. The computing device can be a component in a robotics picking system. The network(s) can include any appropriate network, such as the Internet, a local area network (LAN), a cellular network, an Ethernet, or other such wired and/or wireless network. The content provider environment 246 can include any appropriate resources for providing content from a resource provider, as may include various servers, data stores, and other such components known or used for providing content from across a network (or from the "cloud").

In this example, a request received to the content provider environment 246 can be received by an interface layer 248 of the environment. As known for network environments, the interface layer can include components such as interfaces (e.g., APIs), load balancers, request and/or data routers, and the like. If the request is a request for content, such as for content for a set of pick points for an object, information for the request can be directed to one or more content managers 240 and/or content servers, which can obtain the content from a content data store 254 or other such repository to be sent back across the network(s) to the computing device. In some embodiments, information for the request might also be compared against user data in a user data store 256 or other such location do determine, for example, whether the user has access rights to that content. In some embodiments user data might also be analyzed to determine which type of content to provide, additional supplemental content to provide with the primary content, and the like.

In some embodiments a query image can be received from a computing device 242 and directed to a query component 264, for example, which is configured to analyze the query image to attempt to recognize an object represented in the query image, or at least a type or classification of the object represented. Once determined, information for the object and/or classification can be provided to the content server 240 to determine the primary content to provide in response to the query image. The information can also be provided to a recommendations engine 272, which can use the information, along with any other appropriate information, to recommend a pick order, pick settings, or other picking strategy. This can take the form of computer-readable instructions for a robotic picking system. The content server 240 can then pull the content for the recommendations from a content data store 254, or other such location, to be provided to the computing device 242.

The classification can be determined using a trained classifier, such as may utilize a model 262 or other such deep network or machine learning algorithm, etc. A training component 270 can perform the training on the models and provide the resulting results and/or trained models for use in determining the appropriate classifications. An image synthesizer 282 or other appropriate component such as layers engine 208 can be used to generate at least some of the images used to train the model 222, such as a convolutional neural network. As mentioned, for CNN-based approaches there can be images submitted that are classified by the type of object represented. In certain embodiments, training a neural network may involve significant use of computation resources and time, such that this may correspond to a preparatory step to servicing search requests and/or performed relatively infrequently with respect to search request servicing and/or according to a schedule. In accordance with various embodiments, individual images in the set of training images can be associated with a classification for an object depicted in the image or a subject represented in the image. According to some embodiments, training images and respective training object labels can be located in a data store 292 that includes images of a number of different objects.

Figure 3A:
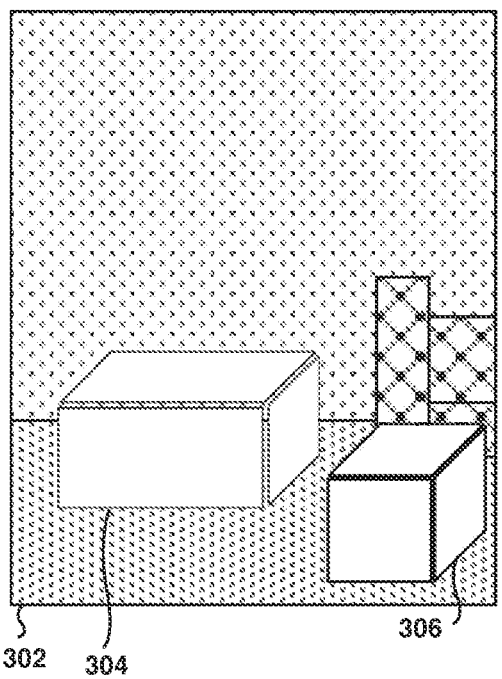
Figure 3B:
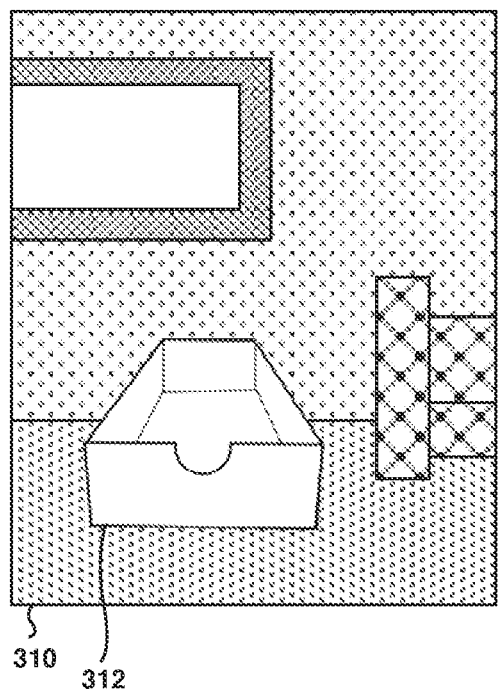

As described, approaches in accordance with various embodiments can attempt to generate or "synthesize" training images for use in training one or more models (e.g., neural networks) or other machine learning algorithms. Such approaches can take representations of classified objects, such shipping packages, and remove the background region(s) from those images. The object representations can then be pasted over, blended, or inserted into, images including various backgrounds (e.g., bins) to generate additional training images of varying complexity and composition. For example, consider the example background removal process illustrated in FIGS. 3A, 3B, 3C, and 3D. In this example, FIG. 3A includes foreground imaging data 302. Foreground imaging data 302 can include 3D image and/or video data. The 3D image and/or video data may comprise one or more 3D point clouds. The 2D image and/or video may include a representation of one or more 2D objects such as box 304 and box 306. FIG. 3B includes background imaging data 310. Background imaging data 310 can include imaging data representing an environment, such as bin 312.

Foreground imaging data 302 can be analyzed to identify imaging data representing box 304 and box 306. For example, foreground imaging data 302 can be analyzed using any one of a number of object identification approaches to identifying pixels corresponding to box 304 and box 306. Once box 304 and box 306 are identified, pixels corresponding to the boxes or pixels corresponding to areas of foreground imaging data 302 that include the boxes can be determined. In an example, a first bounding box can bound pixel values corresponding to box 304 and a second bounding box can bound pixel values corresponding to box 306. The bounding boxes can include, e.g., information (e.g., position information) of pixel locations that include box 304 and box 306. In certain embodiments, the boundary defined by the bounding box may include the entire selection area that includes the object or a portion of the selection area that includes the object. Similarly, background imaging data 310 can be analyzed to identify imaging data representing bin 312.

Figure 3C:
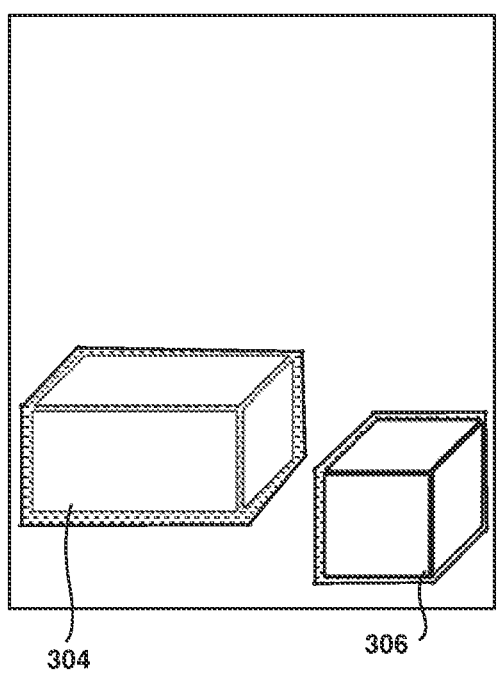
Figure 3D:
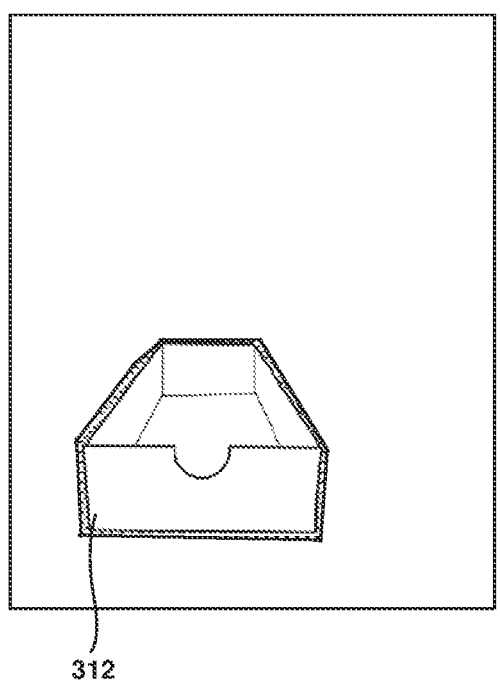

The background image portion of foreground imaging data 302 can then be removed as illustrated in FIG. 3C. In one embodiment, one way to remove the background is to start at the corners of foreground imaging data 302, where representation of box 304 and 306 is very unlikely to be located, and move inward removing from consideration all pixels outside the bounding boxes. As used herein, pixels can be removed from consideration in a number of different ways, such as by cropping the image to exclude those pixels or setting those pixels to be transparent, among other such options. Various approaches can be used to determine the connected background region(s), as may include connected components or other such approaches. Similarity, the background image portion of background imaging data 310 can be removed as illustrated in FIG. 3D.

Once the objects (e.g., box 304 and box 306) are extracted, foreground imaging data 302 can be analyzed to determine whether the objects represented by box 304 and box 306 are "pickable." In the situation that the objects (e.g., box 304 and 30 are determined pickable, the objects may be labelled as "pickable." An object can be considered pickable when a robotics component associated with a picking system is able to pick up the particular object. In an embodiment, whether an object is pickable can be based on various label and label-type data for that object, and/or the pick points or selection information for that object and physical pick capabilities of a picking system.

To determine pick points for an object, one or more trained models can be used to analyze foreground imaging data 302. More specifically, foreground imaging data 302 can be evaluated using a model trained to identify pick points, which would be familiar to a person of ordinary skill in the art, for generating an algorithm that predicts pick points for objects that may be depicted in an image associated with a pick request. For example, a variety of different training models may be used, including, but not limited to Markov Models, Random Walk Models, etc.

In another example of determining pick points, the representations of box 304 and box 306 can be compared to a database of stored objects to identify stored objects similar in shape and size to box 304 and box 306. In this example, an object matching algorithm can be used to process foreground imaging data 302 to determine stored objects that most closely match the size and shape of box 304 and box 306. For example, identified box 304 and box 306 can be compared to stored objects that are associated with respective datasets that specify pick points. The stored objects can include different object types, such as cubic objects, spherical objects, non-cubic and non-spherical objects, etc. The object types can be associated with pick point selection factors, such as shape, weight, size, orientation, material, etc. A dataset, such as, for example, a lookup table can correlate different sets of pick point selection factors (e.g., height, position, angle, surface area, shape, volume, color, texture, shadows, obfuscation, etc.) with different pick points. Stored objects that most closely matched box 304 and box 306, or at least match to a threshold level, can be selected and their point points identified.

In another example of determining pick points, foreground imaging data 302 can be analyzed to identify objects depicted in the imaging data based on one or more identification factors (e.g., shape, edges, boundaries, color, texture, shadow, distance, etc.) For example, foreground imaging data 302 can be analyzed using an object detector to identify box 304 and box 306. Upon identifying each object depicted in the image, a set of pick point selection factors associated with each object can be identified by applying an algorithm developed based on a training model. Thereafter, the object's identified set of pick point selection factor(s) maintained in the lookup table and/or in an algorithm that is generated from the training model can be used to determine the corresponding pick point for the object.

In the situation where pick points fail to be automatically determined, or at least fail to be determined within a threshold level of acceptance, a human operator or other authorized person is provided with an image of the pick station. The human operator may provide pick points for enabling effective robotic picking of one or more objects that are represented in the image.

Once the pick points are determined, the pick points associated with the selected stored objects, or the determined pick points, can be mapped or otherwise associated with locations on box 304 and box 306. Based on the pick points or other selection information and capabilities of a robotic component, a determination can be made whether box 304 and box 306 is pickable. For example, the pick points or other selection information can be obtained by one or more of a robotics AI engine, a remote AI engine, or a robot or robotics device. Based on the available pick points, and configuration information for the robotics device, a determination is made whether that robotics device can pick up the object, such as box 304 or box 306. For example, based on a position and/or orientation of an object, and thus the availability of one or more pick points, a determination can be made whether a picking component can pick up the object. In an example, this might include comparing the available picks points to a threshold number or pick points, occlusion threshold, or other acceptance criteria or threshold level of acceptance.

In an embodiment, the acceptance criteria can be based on capabilities of a picking system. For example, the robot or robotics device may be a 6-axis robot. In other embodiments, the robot or robotic device may have a greater or lesser number of axes or degrees of freedom. In one embodiment, the robot or robot or robotics device may be comprised of a moveable components with an end effector (herein also referred to as a picking apparatus) attached thereto. The one or more moveable components may include any number of robotic components that may be used to position the picking apparatus with respect to an object such that the end effector may picks up the object by navigating to a selected pick point. The robot or robotics device may receive information associated with an object's pick point from one or more of a robotics AI engine, remote AI engine, or user device. The end effector may include any apparatus known in the art that may be used to pick up an object. For example, the end effector may be a gripper. In other forms, the end effector may be comprised of a vacuum gripper having a plurality of vacuum powered suction cups configured to pick up objects from a pick station and/or a reachable area. In one form, the suction cups may be arranged in a 2×2 grid, 3×3 grid, and/or other geometric orientations. The number of suction cups may vary with the needs of the application. In other embodiments, other forms of grippers or other types of end effectors may be employed. In one embodiment, the suction cups may form an XY plane of an end effector and/or XY plane of end effectors. A picking apparatus may include different sets of suction cups of different sizes and/or orientations. For example, a picking apparatus may include a first set of suction cups of a first size and a second set of suction cups of a second size. In certain implementations, the first set of suction cups may be used to pick up an object of a first size (e.g., a top surface of less than 1 meter) and/or a first weight (e.g., less than 5 pounds). The second set of suction cups may be larger in size or number than the first set of suctions cups, and hence, the second set of suction cups may be used to pick up an object of a larger size and/or heavier weight (e.g., a top surface of more than 1 meter or second weight (e.g., more than 5 pounds) as compared to those objects picked up using the first set of suction cups.

In some situations, the object may be occluded, which can affect the determination whether an object is pickable. For example, a particular object may be labeled as, for example, "un-occluded" and/or "pickable," etc. if the trained model is used to determine that an associated robotics device may pick up an object represented by the imaging data, such as a package that is unobstructed by other packages. An object may be labeled as, for example, "occluded" and/or "un-pickable," etc. if the trained model is used to determine that an associated robotics device may not pick up the object, such as a package that is obstructed by other packages and cannot be picked up without risking harming the other, obstructing packages.

A composite image 402 also referred to as a synthesized image that includes labelled foreground objects box 304 and box 306, and background object bin 312 can be generated, as illustrated in FIG. 4A. In this example, an image blending technique such as an image stitching technique, alpha blending, or other appropriate technique can be used to blend imaging data corresponding to box 304 and box 306 and background object bin 312. The amount of blending can be performed to attempt to create a smooth transition between box 304, box 306, and bin 312 instead of an abrupt change between boundaries of the different object representations. In some embodiments, the blending can be performed by blurring a binary mask with a Gaussian kernel. The size of the kernel can be determined using a fraction of the dimensions of the mask itself. Such an approach can be equivalent to a gradual alpha blending between the foreground and the background at the mask boundaries.

In various embodiments, one or more morphological operations can be performed on the mask to attempt to blend the object representations. The morphological operations can include operations such as opening, erosion, and/or dilation, among other such options. The operations can also include combinations or sequences of these operations. For example, an approach in accordance with one embodiment utilizes an erosion followed by an opening operation, where the opening involves both an erosion and a dilation. In this example, the initial erosion is performed using a slightly larger structuring element than is used for the opening operation. The erosion process involves removing pixels from around an edge using a structuring element or tool that makes the object thinner and can in at least some embodiments also smooth the edge based at least in part upon the size and shape of the tool. The second erosion also makes the object smaller by taking away some of the edge information, followed by a dilation that adds some thickness back, such as by blending or extending the pixel values near the edge. Both morphological operations can be performed using structural elements (e.g., circles) that are a fraction of the size of the overall mask dimensions. As mentioned, the second erosion and dilation can utilize a smaller structuring element in order to generate a finer edge that would otherwise result from the first erosion, but the first erosion will remove a significantly larger portion of the artifact region. In embodiments that utilize alpha blending, the morphological operation(s) can be performed before the alpha blending, such that the artifact can be substantially removed before alpha blending is performed to remove any resulting jagged edge regions due to the background mask. While the removal of shadow regions and intra-item regions may not be perfect, these artifacts will differ appreciably between images such that there should be no significant impact on the overall training of the model. The morphological processing discussed herein can generate a mask that enables the object image region to be blended into the background image with minimal detectable artifacts that would impact the model training.

In some embodiments additional processing can be performed to further improve the accuracy of the training using the synthesized images. For example, scaling can be applied to attempt to match the scale of an object to the scale of the background to provide more realistic images. The scale in some embodiments can be determined by processing the background with an object identification algorithm and then determining the apparent size of that object in the image. Further, lighting, contrast, and/or coloration adjustments can be made to improve realism as well. In some embodiments there can be a relighting attempted for the synthesized image to attempt to improve the overall appearance and realism.

In various embodiments, an additional layer of data (including, for example, 3D point cloud data) for other objects, boxes, envelopes, etc. may be added to the composite image 402. For example, FIG. 4B illustrates an example composite imaging data 414 also referred to as synthesized imaging data that includes an additional layer of data that includes a representation of box 412. In this example, composite image includes box 304, box 306, and box 412 within bin 312. The object representation can be blended in accordance with the embodiments described herein.

Once the synthesized image is generated, the synthesized image can be saved as a single image file that can then be fed to a training module, or other such system or service, for use in training a model (e.g., neural network) for objects of this classification. It should also be stated that any classification metadata or other such information can also be stored or otherwise associated with the synthesized image, such that the model can be trained using the synthesized image even though the background image may have no such classification data. As discussed elsewhere herein, the metadata of the background image can be used to identify objects in the background, which can be used to select or exclude certain background images for consideration for synthesized training images.

In accordance with various embodiments, the composite imaging data may be analyzed to determine if the labeled foreground data is still "pickable." If so, the composite image may be labelled "pickable" and may be used as training data to a model. If the labelled foreground data is no longer "pickable" because of occlusion by other layers, then the composite imaging data may be labelled "unpickable." The data labelled "unpickable" may also be used as training data to train the model. A set of such images can be generated such that between the real-world images and the synthesized images there are a sufficient number of images to train the model for each relevant object.

For example, FIG. 5A illustrates a top view of bin 312 represented in composite imaging data 414. In this example, box 304, box 306, and box 412 are organized in a particular arrangement. Box 304 can be associated with pick points 503, box 306 can be associated with pick points 505, and box 412 can be associated with pick points 507. As described herein, pick points can be specified in selection data or other appropriate data. Composite imaging data 414 can be analyzed to determine if box 304, box 306, and/or box 412 is occluded. For example, and as described herein, the determination can be whether a threshold pickable area or threshold available pick points is satisfied. If a determination is made that box 304, box 306, and/or box 412 satisfies an acceptance criteria, e.g., an occlusion threshold, then that box (e.g., pixel values corresponding to the representation of the box) may be labelled or classified as "pickable," or another appropriate label that indicates the object is capable of correctly being handled by a robotics system in composite imaging data 414 and composite imaging data 414 may be included in a training data set. In an embodiment, the acceptance criteria may be based on capabilities of a picking system. Accordingly, acceptance criteria may be dynamic and thus, can be updated based on information specifying the capabilities of a picking system, as described herein.

If a determination is made that the object represented by the data initially extracted by the foreground image extractor 206 fails to satisfy acceptance criteria (e.g., fails to satisfy an occlusion threshold), then the object represented by the data initially extracted by the foreground image extractor 206 may be labelled or classified as "un-pickable," or some other comparable label indicating the object at that time is not capable of correctly being handled by the robotics picking system, in the composite data and the composite data may be included in a training data set. In an example, if box 304, box 306, and/or box 412 is occluded, e.g., fails to satisfy an occlusion threshold, then that box (e.g., pixel values corresponding to the representation of the box) may be labelled as "un-pickable" in composite imaging data 414 and composite imaging data 414 may be included in a training data set or discarded.

As described, additional synthesized images can be generated by adding representations of objects, removing representations of objects, rearranging representations of objects, or a combination thereof, with different background imaging data in accordance with the embodiments described herein. FIG. 5B illustrates one such example. In this example, a top view of bin 312 represented in imaging data 502 is provided. As shown, box 304, box 306, and box 412 are organized in a different arrangement than the arrangement of the boxes illustrated in FIG. 5A. To determine an appropriate label for imaging data 502, or for objects represented in imaging data 502, imaging data 502 can be analyzed to determine whether box 304, box 306, and/or box 412 satisfies an acceptance criteria (e.g., occlusion threshold). Based on the determination, imaging data 502, or box 304, box 306, and/or box 412 can be labelled accordingly. Thereafter, imaging data 502 may be included in a training data set or discarded.

FIG. 5C illustrates yet a different arrangement of the boxes. In this example, a top view of bin 312 represented in imaging data 504 is provided. Box 304, box 306, and box 412 are organized in an arrangement where box 306 and box 304 are occluded by box 412. In this situation, box 306 and 306 fail to satisfy an acceptance criteria. In the situation where it is determined that box 306 fails to satisfy an acceptance criteria, then box 306 may be labelled as "unpickable." Similarly, in the situation where it is determined that box 304 fails to satisfy an acceptance criteria, then box 304 may be labelled as "un-pickable." Thereafter, imaging data 504 may be included in a training data set or discarded.

In accordance with various embodiments, information specifying the arrangement of boxes and labels associated with the boxes for a particular arrangement can be used to generate additional training data. For example, the labels can specify whether a box is occluded, the amount of occlusion, whether one or more objects where stacked or on top of the box, the spacing around the box, whether the box can be differentiated by a robot vision system, etc., for a particular arrangement. A trained model can evaluate arrangement information for different objects associated with respective object properties (e.g., object size, shape, dimension, etc.) to generate arrangement information that can be used to automatically arrange objects. In certain embodiments, a configuration file specifying arrangement criteria can additionally be used to determine arrangement information. The configuration file can specify, for example, minimum spacing between objects, acceptable levels of stacking for different object types, etc. The arrangement information and configuration file can be utilized for a number of purposes. In an example, a model can be trained to determine whether to pick up an object. In another example, a model can be trained to determine an order for picking objects. In yet another example, a model can be trained to determine the optimal placement or arrangement of objects. In another example, a picking system can attempt to pick up an object and the result of the attempt can be used to label object representations as pickable or un-pickable. For example, a bin with objects can be evaluated by picking system. In an example, this can include picking system analyzing imaging data of objects and using instructions from the analysis to attempt to pick up objects. In the situation the picking system is able to pick up an object, imaging data including a representation of the object can be labelled pickable. In the situation the picking fails to pick up an object, imaging data including a representation of the object that was not picked up can be labelled un-pickable.

FIG. 6 illustrates an example process 600 for obtaining images for training a model (e.g., neural network) that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a set of classifications is determined 602 for a type of object (e.g., box, shipping package, etc.) This can include, for example, variations of a type of object. A set or variety of real-world images can be obtained 604 that show objects of those classifications in real-world settings or environments, as may have been captured by users or provided by other such entities. In addition, a set of catalog images is obtained 606 that also includes representations of those classifications of objects. This can be from an electronic catalog maintained by a service provider or a third party, or from multiple sources, among other such options. Further, the images may not be related to a catalog but may come from one or more other types of image collections in accordance with various embodiments. For at least some of the images, such as a randomly selected subset or another such determination, text or other content associated with the images can be analyzed to determine whether one or more objects represented in those images correspond to a classification for which a model is to be trained. For example, labelled imaging data can include imaging data associated with metadata or other data that specifies whether an object represented in the imaging data is capable of correctly being handled by a robotics picking system in accordance with embodiments described herein, or otherwise satisfies acceptance criteria. In an example, set of images might include metadata such as "un-occluded," "occluded," "un-pickable," "pickable," "acceptable," "readable," or a combination thereof. The classifications in at least some embodiments will be selected from a set of classifications, or sub-classifications, used to identify various types of object.

In addition to the images including representations of objects, a set of background images can also be obtained 608. The background images can include representations of a number of different scenes or environments, such as a bin, with a variety of types of scenes included. A subset of the background images can be selected 610 based at least in part upon the content of those images. As mentioned, the content can be determined based upon tags or metadata for the images, or by using object detection algorithms, among other such options. For some of all of the catalog images, and in some cases the images may be processed more than once as discussed herein, a catalog image of the set is selected 612 for processing. During processing the object portion of the image can be determined and/or isolated 614 for use in generating at least one training image. A region of one of the subset of background images can be selected 616 as a background for the synthesized image. The object portion can then be blended 618 into the background region to generate the synthesized training image. The process can continue as long as it is determined 620 that there are more images to process or an insufficient number of training images have been generated for all relevant classifications, among other such criteria. Once the training images have been generated, at least one model such as a convolutional neural network, or other machine learning-based model, can be trained 622 using both the real-world and synthesized training images. As mentioned, in some embodiments a portion of the images will be retained for testing after the training of the neural network.

FIG. 7 is an example process 700 for generating training data that can be utilized in accordance with various embodiments. In this example, imaging data may be obtained 702. For example, the training data generator 130 in FIG. 1B may obtain imaging data (e.g., still images and/or video) from the background imaging system 110 in FIG. 1B. The imaging data may comprise three-dimensional (3D) data, two-dimensional (2D) data, one or more 3D point clouds, one or more representations of 2D objects, or a combination thereof. The imaging data may comprise real-time and/or near real-time imaging data of a monitored area of interest. The imaging data may comprise previously recorded imaging data of a monitored area of interest. The one or more 3D point clouds may represent one or more objects in the monitored area of interest. The one or more 2D objects may represent one or more objects in the monitored area. In a first aspect, the imaging data may be obtained from a mailroom, including, for example, a room configured to manage mail, packages, etc.

Labelled data may be obtained 703. For example, the training data generator 130 in FIG. 1B may obtain labelled data from the foreground imaging system 120 in FIG. 1B. The labelled data may comprise three-dimensional (3D) data. The labelled data may comprise two-dimensional (2D) data. The labelled data may comprise an image. The labelled data may comprise a video. The labelled data may comprise one or more 3D point clouds. The labelled data may comprise representations of one or more 2D objects. The imaging data may be labelled as pickable or un-pickable or another appropriate label. When imaging data is associated with a attributes or label type indicating, for example, that a representation of an object is pickable, a determination may have been made that the picking system 140 in FIG. 1B is allowed to pick up the object represented by the image date. When imaging data is associated with attributes or a label type indicating, for example, that a representation of an object is un-pickable, a determination may have been made that the picking system 140 in FIG. 1B is not allowed to pick up the object represented by the imaging data. In the first aspect, the labelled data may comprise previously labelled imaging data of a mailroom or other appropriate environment.

Background data may be extracted 704. For example, the training data generator 130 in FIG. 1B may extract background data from the imaging data obtained at 702. The background data may comprise a 3D point cloud. The background data may comprise a representation of a 2D object. The background data may represent an object in the monitored area of interest. In the first aspect, the extracted background data may comprise a 3D point cloud representing a container, such as a bin, for mail in envelopes and packages.

At 705, foreground data may be extracted. For example, the training data generator 130 in FIG. 1B may extract foreground data from the labelled data obtained at 703. The foreground data may comprise a 3D point cloud. The foreground data may comprise a 2D object. The foreground data may be selected for extraction based on an associated labelling of pickable. In the first aspect, the extracted foreground may comprise a 3D point cloud representing a package previously labelled as pickable. or another appropriate label that indicates the object is capable of correctly being handled by a robotics system.

At 706, extracted foreground data may be applied to extracted background data to generate composite data. For example, the training data generator 130 in FIG. 1B may apply extracted foreground data to extracted background data to form composite data. In the first aspect, the composite data may include a representation of a container and a representation of a package previously labelled as pickable or otherwise acceptable or readable.

At 707, the foreground data may be labelled in the composite data. For example, the training data generator 130 in FIG. 1B may label the foreground data extracted at 705 in the composite data. The foreground data may be labelled in such a way as the system is forced to revisit the label of the foreground data at 710. The foreground data may be labelled as pickable. In the first aspect, the imaging data representing the package previously labelled as pickable may be labelled as pickable or otherwise as acceptable or readable in the composite data.

At 708, additional layers of foreground data may be added. For example, the training data generator 130 in FIG. 1B may add additional layers of foreground data. Additional layers of foreground data may be added from the labelled data obtained at 703. Additional layers of foreground data may be added from labelled data different from the labelled data obtained at 703. In an example, each layer of foreground data may comprise a 3D point cloud. In another example, each layer of foreground data may comprise a 2D object. In yet another example, each layer of foreground data may comprise a representation of an object previously labelled as pickable. In yet another example, each layer of foreground data may comprise a representation of an object previously labelled as un-pickable. A layer of foreground data may be added a predetermined number of times.

At 710, a determination may be made of if labelled data fails to satisfy an acceptance criteria, e.g., an occlusion threshold, in the composite data. For example, the training data generator 130 in FIG. 1B may make a determination whether the foreground data labelled in 707 is occluded in the composite data. A determination may be made of if any data labelled as pickable in the composite data is occluded. If a determination is made that the labelled data is not occluded, then the next step may be 712. If a determination is made that the labelled data is occluded, then the next step may be 714. For example, a determination may be made whether a representation of a package previously labelled as pickable is occluded in the composite data by any representation of packages added at 308.

At 712, composite data may be labelled as pickable, or another appropriate label that indicates the object is capable of correctly being handled by a robotics system, such as acceptable or readable. For example, the training data generator 130 in FIG. 1B may label foreground data extracted in 705 as pickable, acceptable, or otherwise readable in the composite imaging data. In an embodiment, labelling composite data as pickable may comprise confirming the label applied in 707 for the composite imaging data. In an embodiment, labelling composite data as pickable may comprise not altering the label applied in 707 for the composite imaging data. In the first aspect, in response to determining that the package previously labelled as pickable is not occluded by imaging data including representations of packages added at 708, the imaging data associated with the package previously labelled as pickable may remain labelled as pickable for the composite data.

At 714, composite data may be labelled as un-pickable or some other comparable label indicating the object at that time is not capable of correctly being handled by the robotics picking system, such as unacceptable or unreadable. For example, the training data generator 130 in FIG. 1B may label foreground data extracted in 705 as un-pickable, unacceptable, or unreadable in the composite imaging data. In an embodiment, labelling composite data as un-pickable may comprise denying the label applied in 707 for the composite imaging data. In an embodiment, labelling composite data as un-pickable may comprise altering the label applied in 707 for the composite imaging data. In the first aspect, in response to determining that the package previously labelled as pickable is occluded by imaging data including representations of packages added at 708, the imaging data associated with the package previously labelled as pickable may be labelled as un-pickable for the composite data.

The composite, labelled data may be added to a training data set. For example, the training data generator 130 in FIG. 1B may add the composite data labelled at 712 and/or 714 to a set of training data used to train the picking system 140 in FIG. 1B.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems may be implemented on a standalone computing system. Referring now to FIG. 9, there is shown a block diagram depicting a typical exemplary architecture of one or more embodiments or components thereof on a standalone computing system. Computing system 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 22. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described with respect to FIG. 8). Examples of storage devices 26 include flash memory, magnetic hard drive, CD-ROM, and/or the like.

In some embodiments, systems may be implemented on a distributed computing network, such as one having any number of clients and/or servers.

Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system.

Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48 (including, e.g., keyboard 19, mouse 50, HDD 52, etc.) and network interface card (NIC) 53. I/O unit 48 may, typically, be connected to keyboard 19, pointing device 52, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein.

Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computing system, comprising:
a computing device processor; and
a memory device including instructions that, when executed by the computing device processor, enables the computing system to:
obtain first imaging data including a representation of an object in a real-world environment, the object being associated with a label corresponding to one of a set of classifications,
obtain second imaging data including a representation of one of the real-world environments,
blend the representation of the object with the representation of the one of the real-world environments to generate a composite training image, wherein the representation of the object in the composite training image is associated with the label; and
analyze the composite training image to determine whether to update the label to a different one of the set of classifications.

2. The computing system of claim 1, wherein the instructions, when executed by the computing device processor to analyze the composite training image, further enables the computing system to:
determine selection information associated with the representation of the object in the composite training image,
determine that the selection information satisfies acceptance criteria, and
associate the object represented in the composite training image with a second classification type.

3. The computing system of claim 2, wherein the instructions, when executed by the computing device processor, further enables the computing system to:
determine that a first classification type associated with the object represented in the first imaging data is different from the second classification type associated with the object represented in the composite training image; and
update the label based on the second classification type.

4. The computing system of claim 2, wherein the selection information corresponds to one of a set of pick points associated with the representation of the object in the composite training image or a pickable area of the representation of the object in the composite training image.

5. The computing system of claim 1, wherein the label specifies a first classification type or a second classification type, the first classification type indicating that the representation of the object is capable of being picked up by a robotics picking system, the second classification type indicating that the representation of the object cannot be picked up by the robotics picking system.

6. The computing system of claim 1, wherein the instructions, when executed by the computing device processor to blend the representation of the object, further enables the computing system to:
select a background layer corresponding to a sub-region of the second image data that includes the representation of the one of the real-world environments, determine an object placement region within the sub-region;

place the representation of the object from the first imaging data as a top layer over the object placement region, and use a blending technique on the top layer and the background layer to generate the composite training image.

7. The computing system of claim 6, wherein the instructions, when executed by the computing device processor, further enables the computing system to:

use at least one of a location or a scale based at least on the object placement region to place the representation of the object from the first imagining data as the top layer.

8. The computing system of claim 1, wherein the instructions, when executed by the computing device processor, further enables the computing system to:

obtain a set of catalog images including representations of objects having labels corresponding to a same classification as the object represented in the composite training image, and use the composite training image and the set of catalog images to train a model.

9. The computing system of claim 8, wherein the instructions, when executed by the computing device processor, further enables the computing system to:

receive a query image that includes a representation of a query object, process the query image using the model to determine a classification for the query object, and associate the classification with the object represented in the query image.

10. The computing system of claim 1, wherein the object includes a package, an envelope, a bag, a box, or a container, and wherein the one of the real-world environments includes a bin, a storage area, or a selection area.

11. A computer-implemented method, comprising:

obtaining first imaging data including a representation of an object in a real-world environment, the object being associated with a label corresponding to one of a set of classifications;

obtaining second imaging data including a representation of one of the real-world environments;

blending the representation of the object with the representation of the one of the real-world environments to generate a composite training image, wherein the representation of the object in the composite training image is associated with the label; and analyzing the composite training image to determine whether to update the label to a different one of the set of classifications.

12. The computer-implemented method of claim 11, further comprising:

determining selection information associated with the representation of the object in the composite training image;

determining that the selection information satisfies acceptance criteria; and associating the object represented in the composite training image with a second classification type.

13. The computer-implemented method of claim 12, further comprising:

determining that a first classification type associated with the object represented in the first imaging data is different from the second classification type associated with the object represented in the composite training image; and updating the label based on the second classification type.

14. The computer-implemented method of claim 11, further comprising:

selecting a background layer corresponding to a sub-region of a background image that includes the representation of the one of the real-world environments associated with the second imaging data;

determining an object placement region within the sub-region;

inserting the representation of the object for the first imaging data a top layer over the object placement region; and using a blending technique on the top layer and the background layer to generate the composite training image.

15. The computer-implemented method of claim 14, further comprising:

using at least one of a location or a scale based at least on the object placement region to insert the representation of the object for the first imaging data.

16. The computer-implemented method of claim 11, further comprising:

obtaining a set of catalog images including representations of objects having labels corresponding to a same classification as the object represented in the composite training image; and using the composite training image and the set of catalog images to train a model.

17. The computer-implemented method of claim 16, further comprising:

receiving a query image that includes a representation of a query object;

processing the query image using the model to determine a classification for the query object; and associating the classification with the object represented in the query image.

18. A non-transitory computer readable storage medium storing instructions that, when executed by at least one processor of a computing system, causes the computing system to:

obtain first imaging data including a representation of an object in a real-world environment, the object being associated with a label corresponding to one of a set of classifications;

obtain second imaging data including a representation of one of the real-world environments;

blend the representation of the object with the representation of the one of the real-world environments to generate a composite training image, wherein the representation of the object in the composite training image is associated with the label; and analyze the composite training image to determine whether to update the label to a different one of the set of classifications.

19. The non-transitory computer readable storage medium of claim 18, wherein the instructions, when executed by the at least one processor, further enables the computing system to:

determine selection information associated with the representation of the object in the composite training image;
determine that the selection information satisfies acceptance criteria;
associate the object represented in the composite training image with a second classification type;
determine that a first classification type associated with the object represented in the first imaging data is different from the second classification type associated with the object represented in the composite training image; and
update the label based on the second classification.

20. The non-transitory computer readable storage medium of claim 18, wherein the instructions, when executed by the at least one processor, further enables the computing system to:
select a background layer corresponding to a sub-region of the second image data that includes the representation of the one of the real-world environments;
determine an object placement region within the sub-region;
insert the representation of the object from the first imaging data as a top layer over the object placement region; and
use a blending technique on the top layer and the background layer to generate the composite training image.

* * * * *